US012763499B2

(12) United States Patent
Ashibu

(10) Patent No.: US 12,763,499 B2
(45) Date of Patent: Oct. 13, 2026

(54) TERMINAL BLOCK AND METHOD FOR PRODUCING TERMINAL BODY

(71) Applicant: Japan Aviation Electronics Industry, Ltd., Tokyo (JP)

(72) Inventor: Kenta Ashibu, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 342 days.

(21) Appl. No.: 18/654,332

(22) Filed: May 3, 2024

(65) Prior Publication Data

US 2024/0421513 A1 Dec. 19, 2024

(30) Foreign Application Priority Data

Jun. 13, 2023 (JP) ................................ 2023-096754

(51) Int. Cl.

*H01R 11/01* (2006.01)
*H01R 9/24* (2006.01)
*H01R 11/05* (2006.01)
*H01R 43/16* (2006.01)

(52) U.S. Cl.

CPC ............... *H01R 11/01* (2013.01); *H01R 9/24* (2013.01); *H01R 11/05* (2013.01); *H01R 43/16* (2013.01)

(58) Field of Classification Search

None

See application file for complete search history.

(56) References Cited

U.S. PATENT DOCUMENTS 6,746,193 B1 * 6/2004 Drake .................. F16B 37/043 211/26
8,177,466 B2 * 5/2012 Csik ..................... F16B 37/043 411/174
11,549,545 B2 * 1/2023 Brück ................... H02B 1/012
2014/0334118 A1 11/2014 Neumann et al.

FOREIGN PATENT DOCUMENTS

EP 2777373 B1 3/2017
JP 202261147 A 4/2022

OTHER PUBLICATIONS

Search Report for European Patent Application No. 24173215.5 dated Oct. 22, 2024, 4 pages.
Office Action for European Patent Application No. 24173215.5 dated Nov. 4, 2024, 5 pages.

* cited by examiner

*Primary Examiner* — Tho D Ta

(74) *Attorney, Agent, or Firm* — Lippes Mathias LLP

(57) ABSTRACT

To implement a terminal block that contributes to reducing the size of the terminal block. A terminal block according to an embodiment of the present disclosure includes a terminal body that includes a first plate portion, a second plate portion disposed to overlap the first plate portion, a first coupling portion connecting one end portion of the first plate portion to one end portion of the second plate portion, a third plate portion disposed between the first plate portion and the second plate portion, a second coupling portion connecting the other end portion of the first plate portion to one end portion of the third plate portion, and a penetrating hole formed in the first plate portion. A first conductive member is electrically connected to the third plate portion via the penetrating hole.

10 Claims, 42 Drawing Sheets

TERMINAL BLOCK AND METHOD FOR PRODUCING TERMINAL BODY

INCORPORATION BY REFERENCE

This application is based upon and claims the benefit of priority from Japanese patent application No. 2023-96754, filed on Jun. 13, 2023, the disclosure of which is incorporated herein in its entirety by reference.

BACKGROUND

The present disclosure relates to a terminal block and a method for producing a terminal body.

A terminal block is typically used to electrically connect a first conductive member and a second conductive member. For example, as shown in FIG. 42, a terminal block 100 of Japanese Unexamined Patent Application Publication No. 2022-61147 is configured such that a first terminal 101 and a second terminal 102 are inserted into a main housing 104 while being electrically connected together with a braided wire 103.

At this time, the first terminal 101 is held in the main housing 104 via a first sub-housing 105 so that the first terminal 101 is movable in a direction perpendicular to the penetration direction of a bolt insertion hole 101a of the first terminal 101. In addition, the second terminal 102 is held in the main housing 104 via a second sub-housing 106 so that the second terminal 102 is movable in a direction perpendicular to the penetration direction of a bolt insertion hole 102a of the second terminal 102.

Accordingly, even when a first conductive member electrically connected to the first terminal 101 is displaced with respect to the first terminal 101, the braided wire 103 deforms and allows the first terminal 101 to move with respect to the main housing 104. This can absorb the positional displacement of the first conductive member with respect to the first terminal 101, and thus allows the first conductive member and the first terminal 101 to be electrically connected to a nut 107, which is provided in the first sub-housing 105, in an excellent state.

Meanwhile, even when a second conductive member electrically connected to the second terminal 102 is displaced with respect to the second terminal 102, the braided wire 103 deforms and allows the second terminal 102 to move with respect to the main housing 104. This can absorb the positional displacement of the second conductive member with respect to the second terminal 102, and thus allows the second conductive member and the second terminal 102 to be electrically connected to a nut 108, which is provided in the second sub-housing 106, in an excellent state. Such a terminal block 100 is attached to a device via a flange member 109.

SUMMARY

The terminal block 100 of Japanese Unexamined Patent Application Publication No. 2022-61147 is configured such that the positional displacement of the first conductive member with respect to the first terminal 101 as well as the positional displacement of the second conductive member with respect to the second terminal 102 is absorbed through the deformation of the braided wire 103. To allow the braided wire 103 to absorb each of the positional displacement of the first conductive member and the positional displacement of the second conductive member in this manner, a certain length of the braided wire 103 would be required, resulting in an increased size of the terminal block 100, which is problematic.

An object of the present disclosure is to implement a terminal block and a method for a producing terminal body that contributes to reducing the size of the terminal block.

A terminal block according to an aspect of the present disclosure includes a terminal; and a housing adapted to accommodate the terminal, in which the terminal includes a terminal body that is a bent body of a conductive material, a first connection portion disposed on one end portion of the terminal body, the first connection portion being adapted to electrically connect to a first conductive member, and a second connection portion disposed on another end portion of the terminal body, the second connection portion being adapted to electrically connect to a second conductive member, the terminal body includes a first plate portion parallel with a plane perpendicular to a first axis, a second plate portion parallel with the plane perpendicular to the first axis, the second plate portion being disposed to overlap the first plate portion in a direction along the first axis, a first coupling portion connecting one end portion of the first plate portion in a direction along a second axis perpendicular to the first axis to one end portion of the second plate portion in the direction along the second axis, a third plate portion disposed between the first plate portion and the second plate portion, the third plate portion being parallel with the plane perpendicular to the first axis, a second coupling portion connecting another end portion of the first plate portion in the direction along the second axis to one end portion of the third plate portion in the direction along the second axis, and a penetrating hole formed in the first plate portion, and the first connection portion is disposed on the third plate portion, and the first conductive member is electrically connected to the third plate portion via the penetrating hole.

A method for producing a terminal body according to an aspect of the present disclosure is a method for producing the terminal body used for the foregoing terminal block, the method including bending a belt-like material made of a conductive material that is long in one axis direction into a flat spiral shape so as to form the third plate portion, the second coupling portion, the first plate portion, the first coupling portion, and the second plate portion of the terminal body.

According to the present disclosure, a terminal block and a method for producing a terminal body can be implemented that that contributes to reducing the size of the terminal block.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. It should be noted that the present disclosure is not limited to the following embodiments. In addition, the following description and drawings are simplified as appropriate for clarification of the description. In the following description, a three-dimensional (XYZ) coordinate system is used for clarification of the description. Specifically, the Z-axis corresponds to a first axis, the Y-axis corresponds to a second axis, and the X-axis corresponds to a third axis.

Embodiment 1

Figure 1:
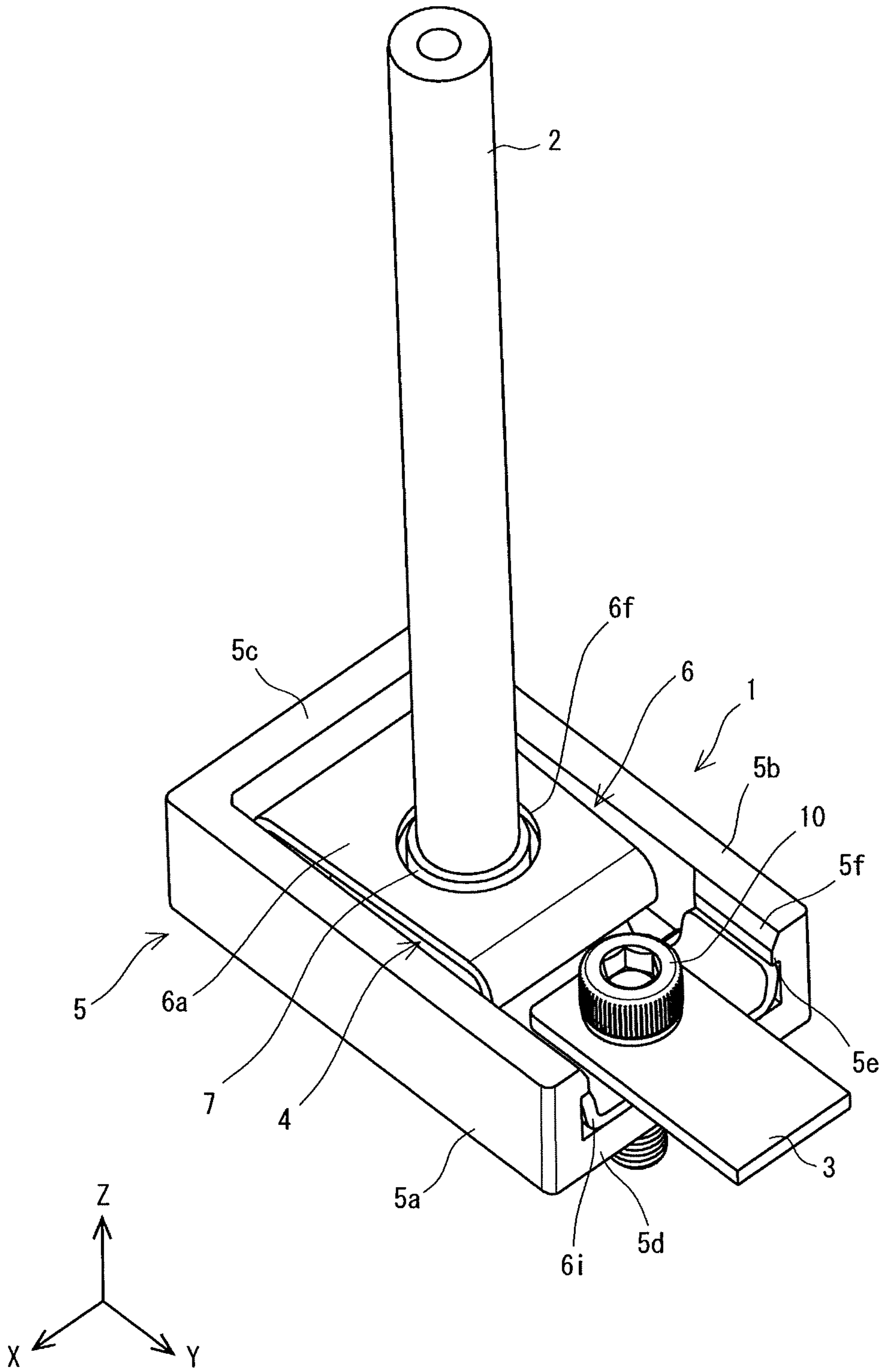
FIG. 1 is a perspective view of a terminal block of Embodiment 1 as seen from the positive side of the Z-axis.
Figure 2:
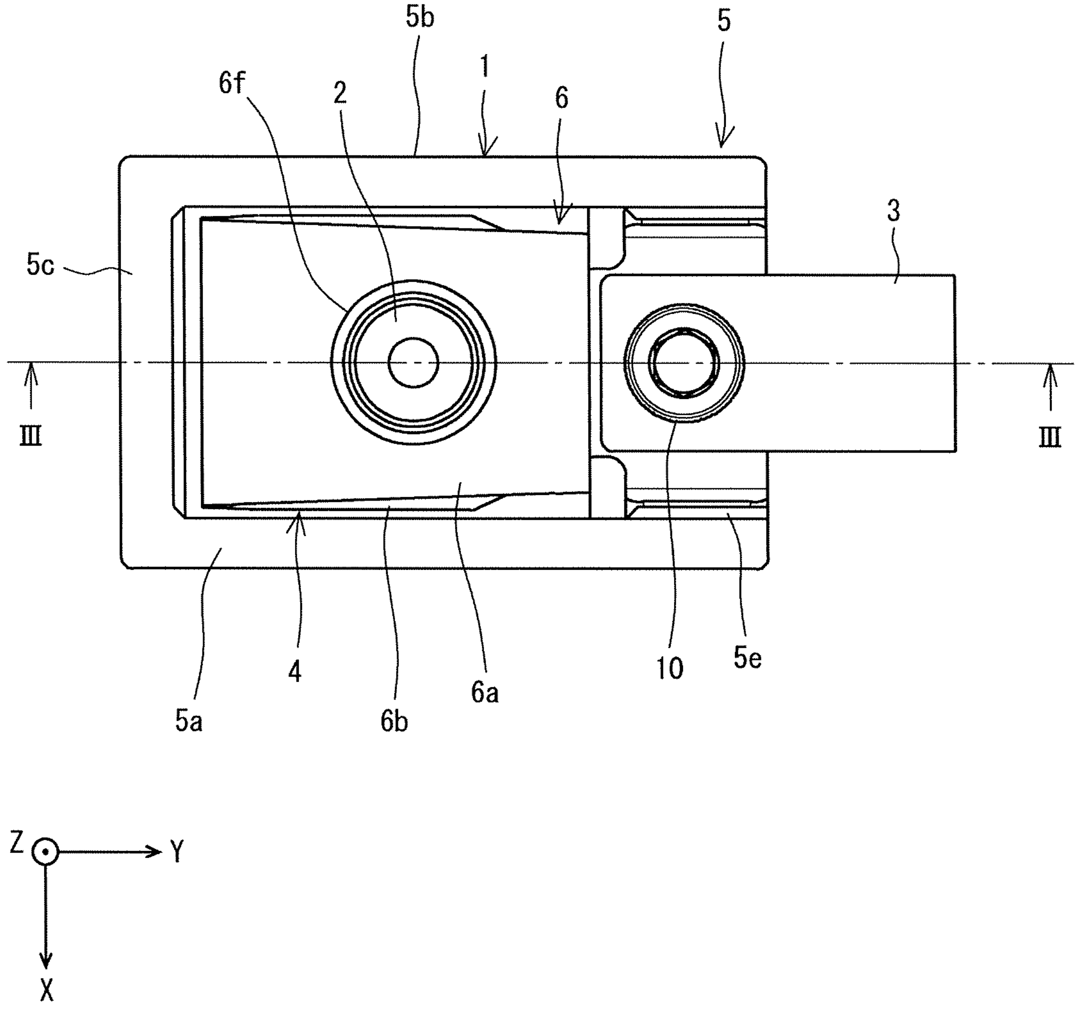
FIG. 2 is a view of the terminal block of Embodiment 1 as seen from the positive side of the Z-axis.
Figure 3:
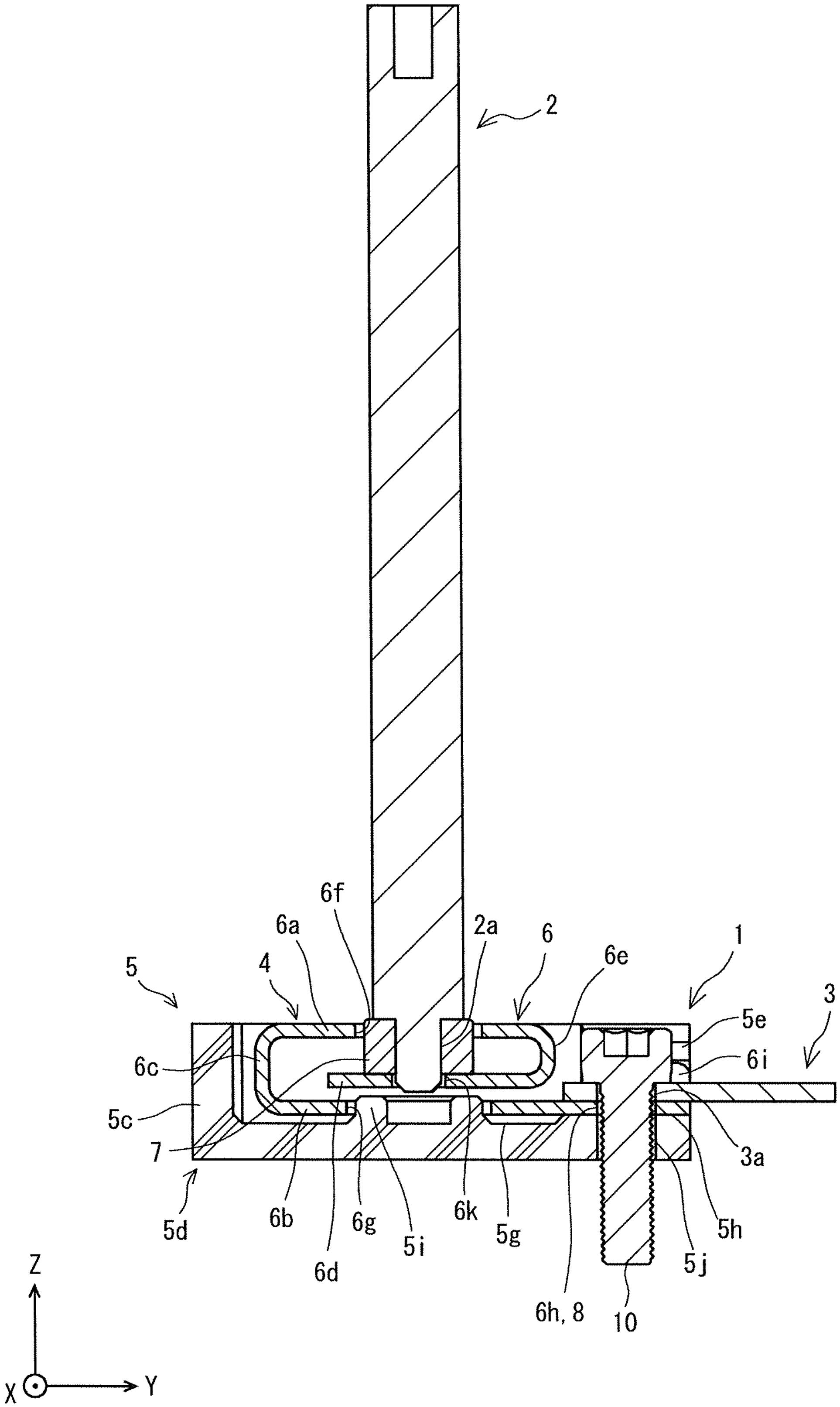
FIG. 3 is a cross-sectional view along line III-III in FIG. 2.
Figure 4:
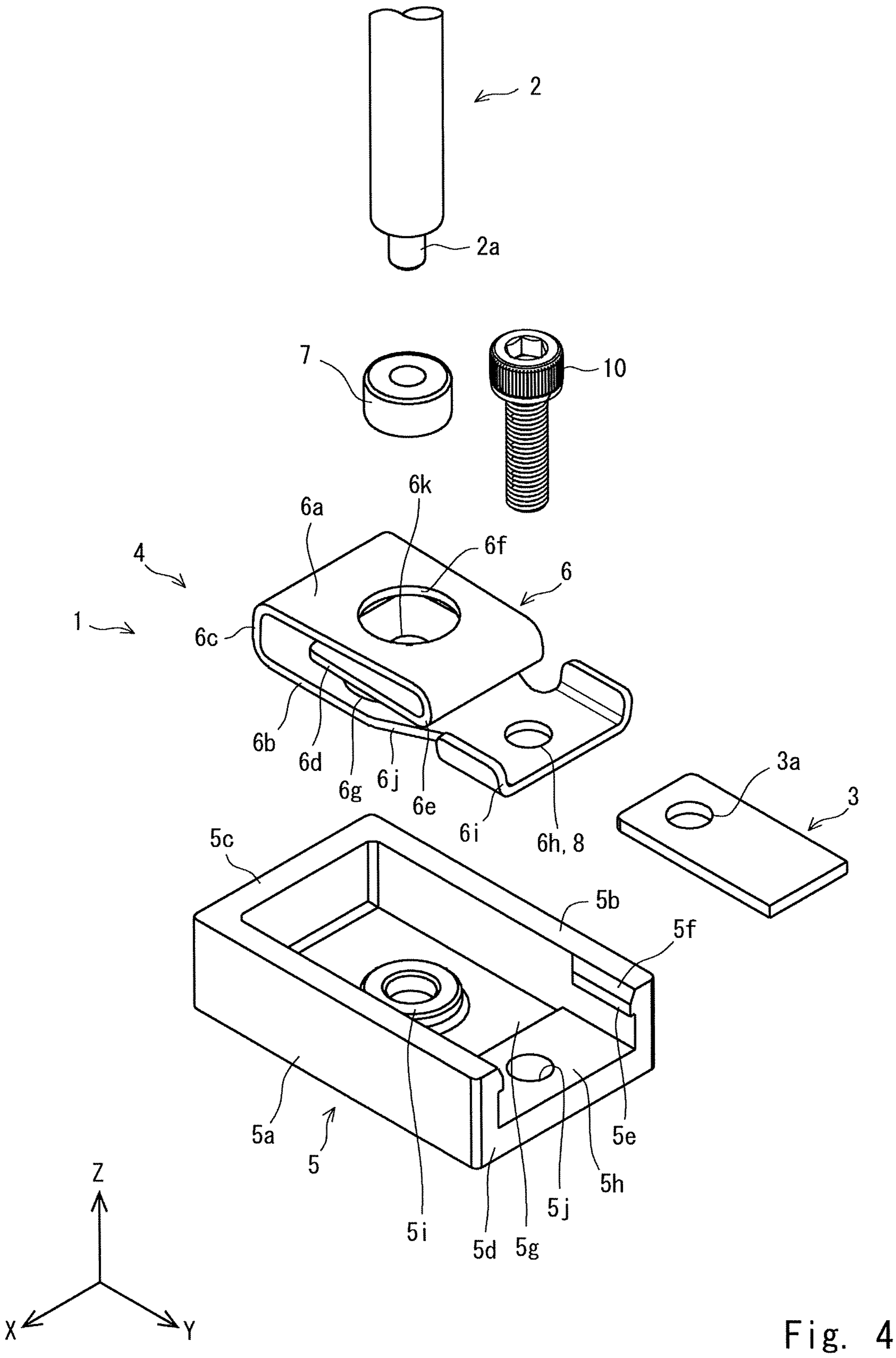
FIG. 4 is an exploded perspective view of the terminal block of Embodiment 1.

The configuration of a terminal block of the present embodiment will be described. FIG. 1 is a perspective view of the terminal block of the present embodiment as seen from the positive side of the Z-axis. FIG. 2 is a view of the terminal block of the present embodiment as seen from the positive side of the Z-axis. FIG. 3 is a cross-sectional view along line III-III in FIG. 2. FIG. 4 is an exploded perspective view of the terminal block of the present embodiment.

As shown in FIGS. 1 to 4, a terminal block 1 is used to electrically connect a first conductive member 2 and a second conductive member 3. Herein, the first conductive member 2 is a substantially cylindrical bus bar extending in the Z-axis direction, for example. Meanwhile, the second conductive member 3 is a plate-shaped bus bar substantially parallel with the XY plane and extending in the Y-axis direction, for example.

As shown in FIGS. 1 to 4, the terminal block 1 includes a terminal 4 and a housing 5. As shown in FIGS. 3 and 4, the terminal 4 includes a terminal body 6, a first connection portion 7, and a second connection portion 8. Though the details will be described later, the terminal body 6 is a bent body obtained by bending a conductive material, such as a belt-like metallic plate, extending in the Y-axis direction into a substantially flat spiral shape.

Figure 5:
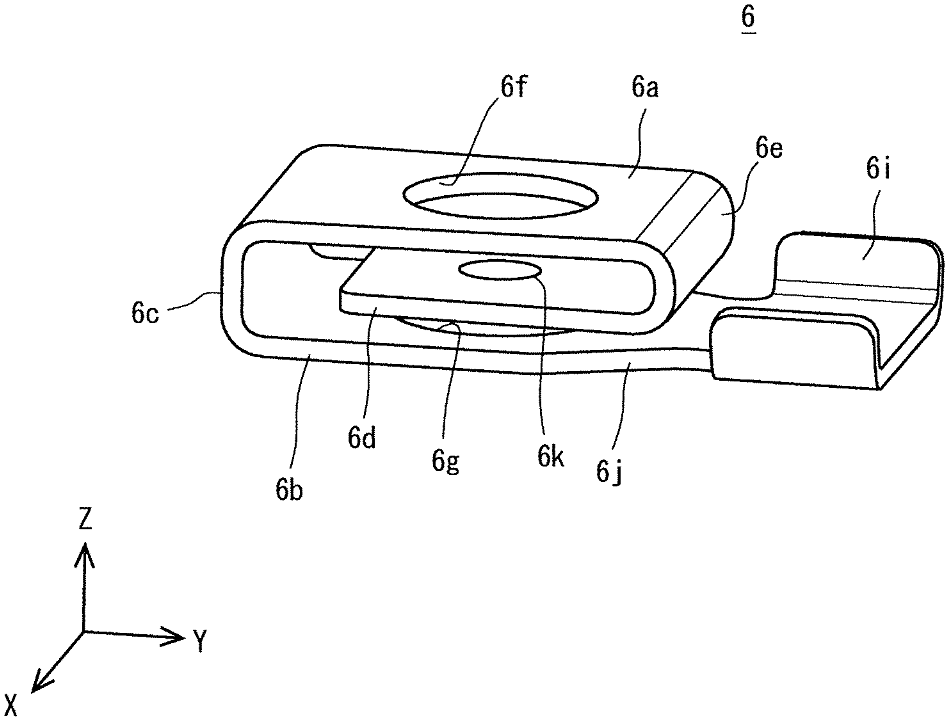
FIG. 5 is a perspective view of a terminal body in the terminal block of Embodiment 1 as seen from the positive side of the Z-axis.
Figure 6:
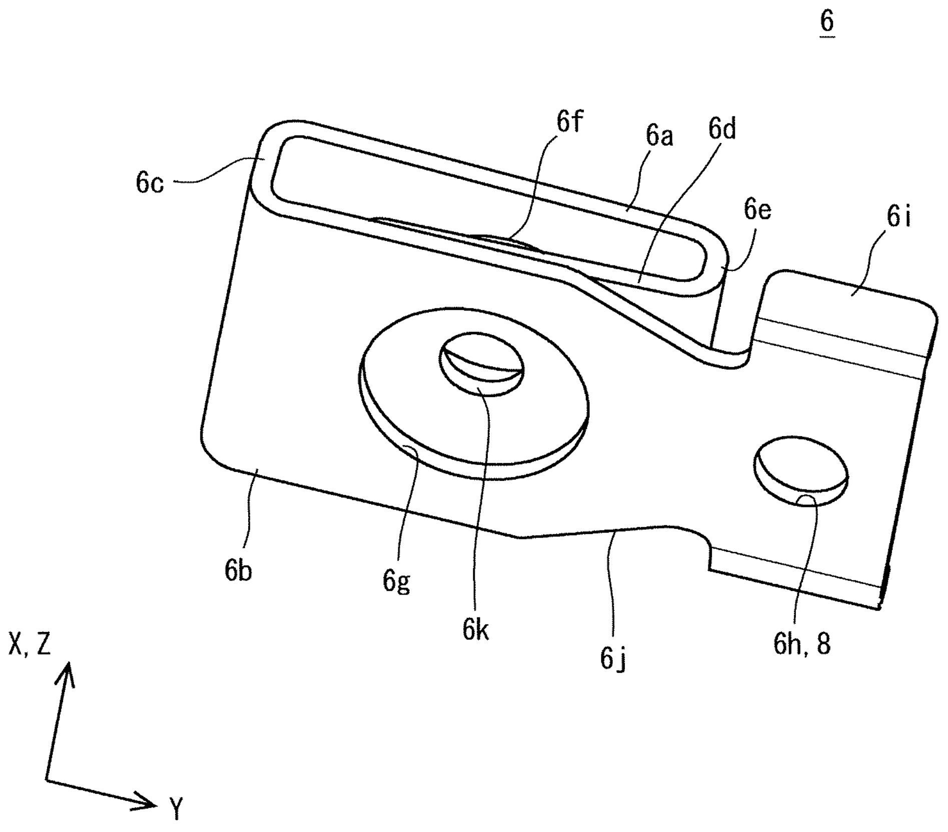
FIG. 6 is a perspective view of the terminal body in the terminal block of Embodiment 1 as seen from the negative side of the Z-axis.
Figure 7:
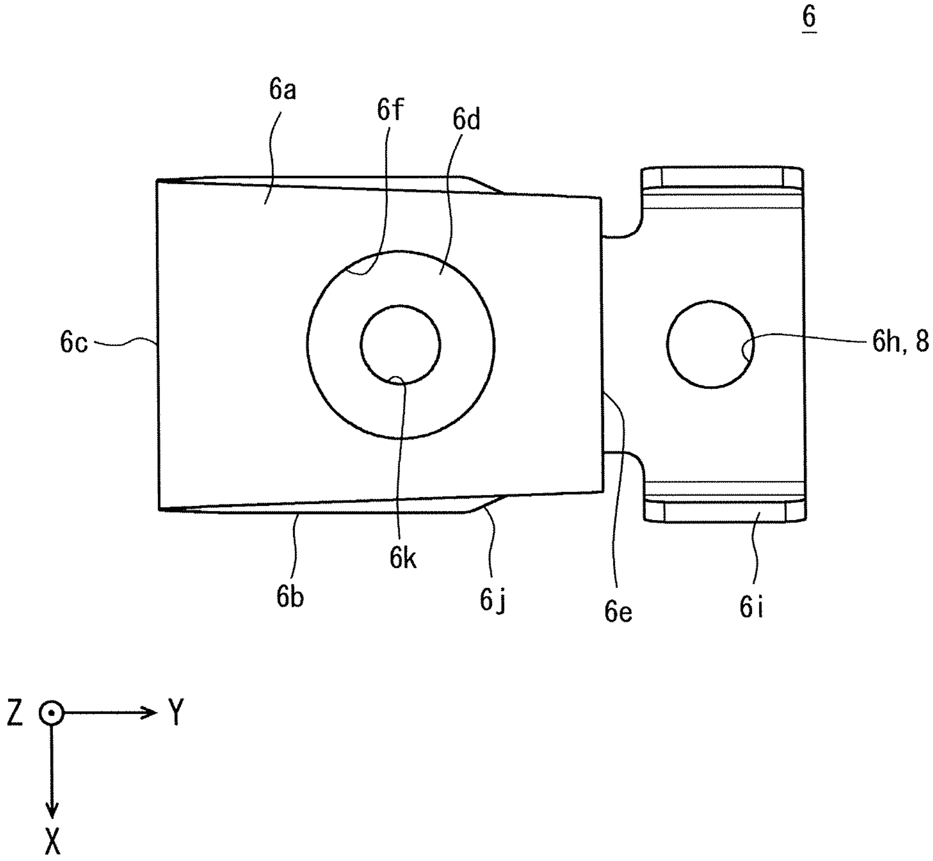
FIG. 7 is a view of the terminal body in the terminal block of Embodiment 1 as seen from the positive side of the Z-axis.

FIG. 5 is a perspective view of the terminal body in the terminal block of the present embodiment as seen from the positive side of the Z-axis. FIG. 6 is a perspective view of the terminal body in the terminal block of the present embodiment as seen from the negative side of the Z-axis. FIG. 7 is a view of the terminal body in the terminal block of the present embodiment as seen from the positive side of the Z-axis.

As shown in FIGS. 4 to 7, the terminal body 6 includes a first plate portion 6*a*, a second plate portion 6*b*, a first coupling portion 6*c*, a third plate portion 6*d*, and a second coupling portion 6*e*. The first plate portion 6*a* is substantially parallel with the XY plane, and extends in the Y-axis direction. The first plate portion 6*a* has a substantially trapezoidal shape such that its width dimension in the X-axis direction decreases along a direction toward the positive side of the Y-axis as seen in the Z-axis direction, for example.

As shown in FIGS. 1 to 7, the first plate portion 6*a* has formed therein a first penetrating hole 6*f* penetrating the first plate portion 6*a* in the Z-axis direction. The first penetrating hole 6*f* is substantially circular in shape as seen in the Z-axis direction, for example. The first penetrating hole 6*f* is disposed in substantially the center of the first plate portion 6*a* as seen in the Z-axis direction, for example.

As shown in FIGS. 4 to 7, the second plate portion 6*b* is roughly and substantially parallel with the XY plane, and extends in the Y-axis direction. The second plate portion 6*b* is substantially rectangular in shape as seen in the Z-axis direction. The width dimension of the second plate portion 6*b* in the X-axis direction is substantially equal to the width dimension of an end portion, which is located on the negative side of the Y-axis, of the first plate portion 6*a* in the X-axis direction. The second plate portion 6*b* is disposed to overlap the first plate portion 6*a* in the Z-axis direction.

More specifically, as shown in FIGS. 3 to 7, the second plate portion 6*b* is disposed on the negative side of the Z-axis with respect to the first plate portion 6*a*. An end portion, which is located on the negative side of the Y-axis, of the second plate portion 6*b* is disposed at substantially the same position as the end portion, which is located on the negative side of the Y-axis, of the first plate portion 6*a* as seen in the Z-axis direction. An end portion, which is located on the positive side of the Y-axis, of the second plate portion 6*b* protrudes to the positive side of the Y-axis beyond an end portion, which is located on the positive side of the Y-axis, of the first plate portion 6*a* as seen in the Z-axis direction.

As shown in FIGS. 3 to 6, the second plate portion 6*b* has formed therein a second penetrating hole 6*g* penetrating the second plate portion 6*b* in the Z-axis direction. The second penetrating hole 6*g* is substantially circular in shape as seen in the Z-axis direction, for example, and is disposed to substantially overlap the first penetrating hole 6*f*.

As shown in FIGS. 3 to 6, the end portion, which is located on the positive side of the Y-axis, of the second plate portion 6*b* has formed therein a third penetrating hole 6*h* penetrating the second plate portion 6*b* in the Z-axis direction. The third penetrating hole 6*h* functions as the second connection portion 8 as described below.

Herein, as shown in FIG. 3, the end portion, which is located on the positive side of the Y-axis, of the second plate portion 6*b* may be wider in the X-axis direction than the other portions. In addition, as shown in FIGS. 4 to 6, the end portion, which is located on the positive side of the Y-axis, of the second plate portion 6*b* may have a horizontally-oriented C-shape as seen in the Y-axis direction. That is, upright portions 6*i* may be provided at opposite ends in the X-axis direction of the end portion, which is located on the positive side of the Y-axis, of the second plate portion 6*b* such that the upright portions 6*i* extend upward to the positive side of the Z-axis. Each of the upright portions 6*i* is substantially rectangular in shape as seen in the X-axis direction, for example.

Note that as shown in FIGS. 4 to 6, the second plate portion 6*b* has formed therein cutout portions 6*j* each having a substantially right triangular shape such that the width dimension of the second plate portion 6*b* in the X-axis direction decreases along a direction toward a region of the end portion, which is located on the positive side of the Y-axis, of the second plate portion 6*b* where the upright portions 6*i* are formed as seen in the Z-axis direction, but such cutout portions 6*j* may be omitted.

As shown in FIGS. 3 to 6, the first coupling portion 6*c* couples the end portion, which is located on the negative side of the Y-axis, of the first plate portion 6*a* to the end portion, which is located on the negative side of the Y-axis, of the second plate portion 6*b*. The first coupling portion 6*c* is roughly in the shape of a plate that is substantially parallel with the XZ plane, for example. The first coupling portion 6*c* is substantially rectangular in shape as seen in the Y-axis direction.

As shown in FIG. 7, the width dimension of the first coupling portion 6*c* in the X-axis direction is substantially equal to the width dimension of the end portion, which is located on the negative side of the Y-axis, of the first plate portion 6*a* in the X-axis direction. As shown in FIGS. 3 to 6, an end portion, which is located on the positive side of the Z-axis, of the first coupling portion 6*c* is continuous with the end portion, which is located on the negative side of the Y-axis, of the first plate portion 6*a*, while an end portion, which is located on the negative side of the Z-axis, of the first coupling portion 6*c* is continuous with the end portion, which is located on the negative side of the Y-axis, of the second plate portion 6*b*.

As shown in FIGS. 3 to 6, the third plate portion 6*d* is substantially parallel with the XY plane, and extends in the Y-axis direction. The third plate portion 6*d* is substantially rectangular in shape as seen in the Z-axis direction. The width dimension of the third plate portion 6*d* in the X-axis direction is substantially equal to the width dimension of the end portion, which is located on the positive side of the Y-axis, of the first plate portion 6*a* in the X-axis direction. The third plate portion 6*d* is disposed between the first plate portion 6*a* and the second plate portion 6*b*.

As shown in FIGS. 3 to 6, the length of the third plate portion 6*d* in the Y-axis direction is smaller than the length of the first plate portion 6*a* in the Y-axis direction. In addition, an end portion, which is located on the positive side of the Y-axis, of the third plate portion 6*d* is disposed at substantially the same position as the end portion, which is located on the positive side of the Y-axis, of the first plate portion 6*a* as seen in the Z-axis direction. Meanwhile, an end portion, which is located on the negative side of the Y-axis, of the third plate portion 6*d* is disposed on the negative side of the Y-axis with respect to the first penetrating hole 6*f* as seen in the Z-axis direction.

As shown in FIGS. 3 to 6, the third plate portion 6*d* has a fourth penetrating hole 6*k* penetrating the third plate portion 6*d* in the Z-axis direction. The fourth penetrating hole 6*k* is substantially circular in shape as seen in the Z-axis direction, for example, and may be disposed substantially concentrically with the first penetrating hole 6*f*. The fourth penetrating hole 6*k* is large enough to pass an external thread portion 2*a* formed on an end portion, which is located on the negative side of the Z-axis, of the first conductive member 2.

As shown in FIGS. 3 to 6, the second coupling portion 6*e* couples the end portion, which is located on the positive side of the Y-axis, of the first plate portion 6*a* to the end portion, which is located on the positive side of the Y-axis, of the third plate portion 6*d*. The second coupling portion 6*e* is curved such that it protrudes to the positive side of the Y-axis as seen in the X-axis direction, for example.

As shown in FIG. 7, the width dimension of the second coupling portion 6*e* in the X-axis direction is substantially equal to the width dimension of the end portion, which is located on the positive side of the Y-axis, of the first plate portion 6*a* in the X-axis direction. As shown in FIGS. 3 to 6, an end portion, which is located on the positive side of the Z-axis, of the second coupling portion 6*e* is continuous with the end portion, which is located on the positive side of the Y-axis, of the first plate portion 6*a*, while an end portion, which is located on the negative side of the Z-axis, of the second coupling portion 6*e* is continuous with the end portion, which is located on the positive side of the Y-axis, of the third plate portion 6*d*.

Such a terminal body 6 is shaped such that the first plate portion 6*a*, the second plate portion 6*b*, and the third plate portion 6*d* are disposed to overlap in the Z-axis direction such that they are substantially parallel with each other. In addition, the terminal body 6 is shaped such that it is bent into a flat spiral shape so as to allow the third plate portion 6*d*, the second coupling portion 6*e*, the first plate portion 6*a*, the first coupling portion 6*c* and the second plate portion 6*b* to be continuous.

Figure 8:
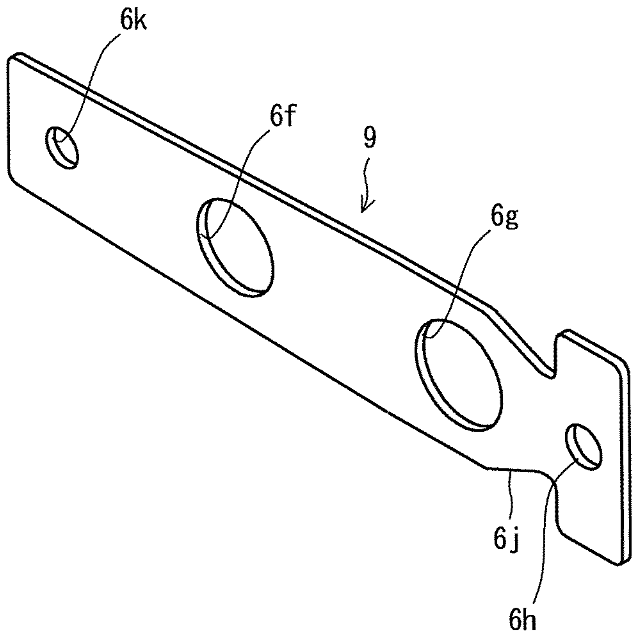
FIG. 8 is a view for illustrating a production flow for the terminal body in the terminal block of Embodiment 1.

Hereinafter, a production flow for the terminal body 6 in the terminal block 1 of the present embodiment will be described. Each of FIGS. 8 to 11 is a view for illustrating a production flow for the terminal body in the terminal block of the present embodiment. First, as shown in FIG. 8, a belt-like material 9, which has the fourth penetrating hole 6*k*, the first penetrating hole 6*f*, the second penetrating hole 6*g*, and the third penetrating hole 6*h* sequentially formed therein, and also has the cutout portions 6*j* formed at predetermined positions, is obtained out of a conductive material, such as a metallic plate, through punching.

Figure 9:
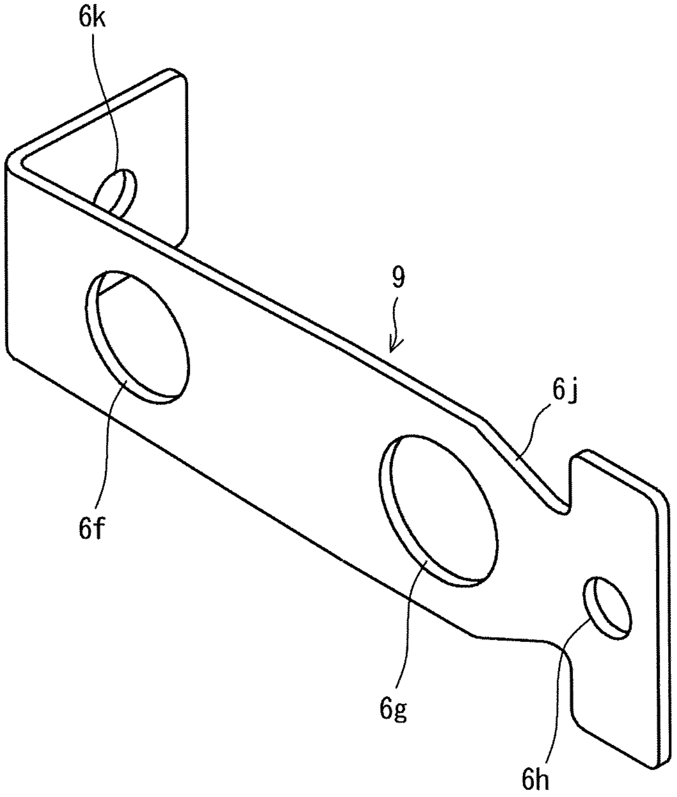
FIG. 9 is a view for illustrating a production flow for the terminal body in the terminal block of Embodiment 1.
Figure 10:
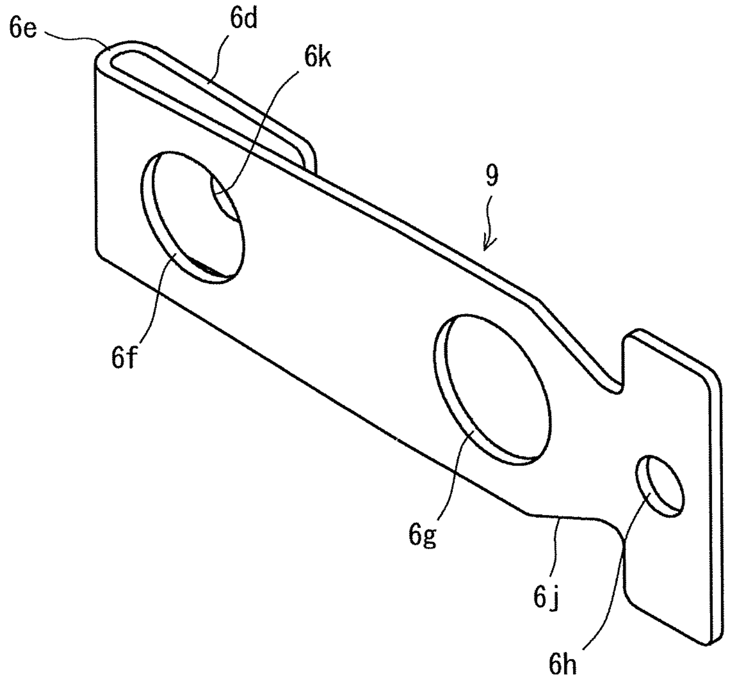
FIG. 10 is a view for illustrating a production flow for the terminal body in the terminal block of Embodiment 1.
Figure 11:
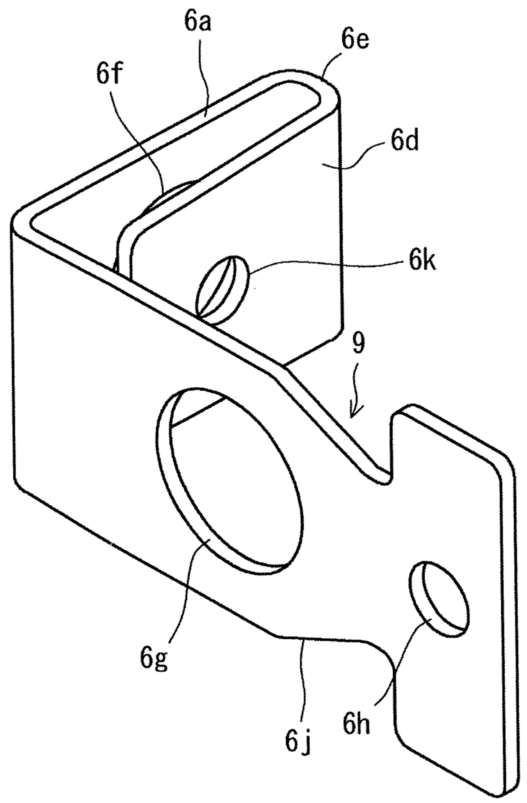
FIG. 11 is a view for illustrating a production flow for the terminal body in the terminal block of Embodiment 1.

Next, as shown in FIGS. 9 and 10, the belt-like material 9 is bent at a position between the fourth penetrating hole 6*k* and the first penetrating hole 6*f* so that the third plate portion 6*d* and the second coupling portion 6*e* are formed. Then, as shown in FIG. 11, the belt-like material 9 is bent at a position between the first penetrating hole 6*f* and the second penetrating hole 6*g* so that the first plate portion 6*a* is formed.

Next, the belt-like material 9, which has been bent at the position to form the first plate portion 6*a*, is bent at a position on the side of the second penetrating hole 6*g*. That is, the belt-like material 9 is bent to have the third plate portion 6*d* located on the inner side so that the first coupling portion 6*c* and the second plate portion 6*b* are formed.

Then, the upright portions 6*i* are formed on the end portion, which is located on the positive side of the Y-axis, of the second plate portion 6*b*. Accordingly, the terminal body 6 such as the one shown in FIGS. 5 to 7 can be produced. In this manner, bending the belt-like material 9 into a flat spiral shape can easily produce the terminal body 6. Note that the upright portions 6*i* may be formed before the belt-like material 9 is bent.

As shown in FIG. 3, the first connection portion 7 is disposed on the third plate portion 6*d* that is one end portion of the terminal body 6. The first connection portion 7 includes a nut that is a representative example of a connection member into which the external thread portion 2*a* of the first conductive member 2 is adapted to be screwed, for example. The first connection portion 7 is fixed to a face, which is located on the positive side of the Z-axis, of the third plate portion 6*d* in a state where the first connection portion 7 is disposed substantially concentrically with the fourth penetrating hole 6*k* as seen in the Z-axis direction, for example.

At this time, as shown in FIG. 3, the end portion, which is located on the positive side of the Z-axis, of the first connection portion 7 may protrude to the positive side of the Z-axis from the first penetrating hole 6*f* of the terminal body 6 in a state where the first connection portion 7 is passed through the first penetrating hole 6*f*. In addition, a gap, which is adapted to tolerate the displacement of the first connection portion 7 in the X-axis direction and the Y-axis direction, may be formed between the outer peripheral side surface of the first connection portion 7 and the circumferential portion of the first penetrating hole 6*f* of the terminal body 6.

As shown in FIGS. 6 and 7, the second connection portion 8 is disposed on the end portion, which is located on the positive side of the Y-axis, of the second plate portion 6*b* that is the other end portion of the terminal body 6. As shown in FIG. 3, the second connection portion 8 includes the third penetrating hole 6*h*, for example, and is adapted to pass a bolt 10 that has been passed through a penetrating hole 3*a* formed in the second conductive member 3.

Figure 12:
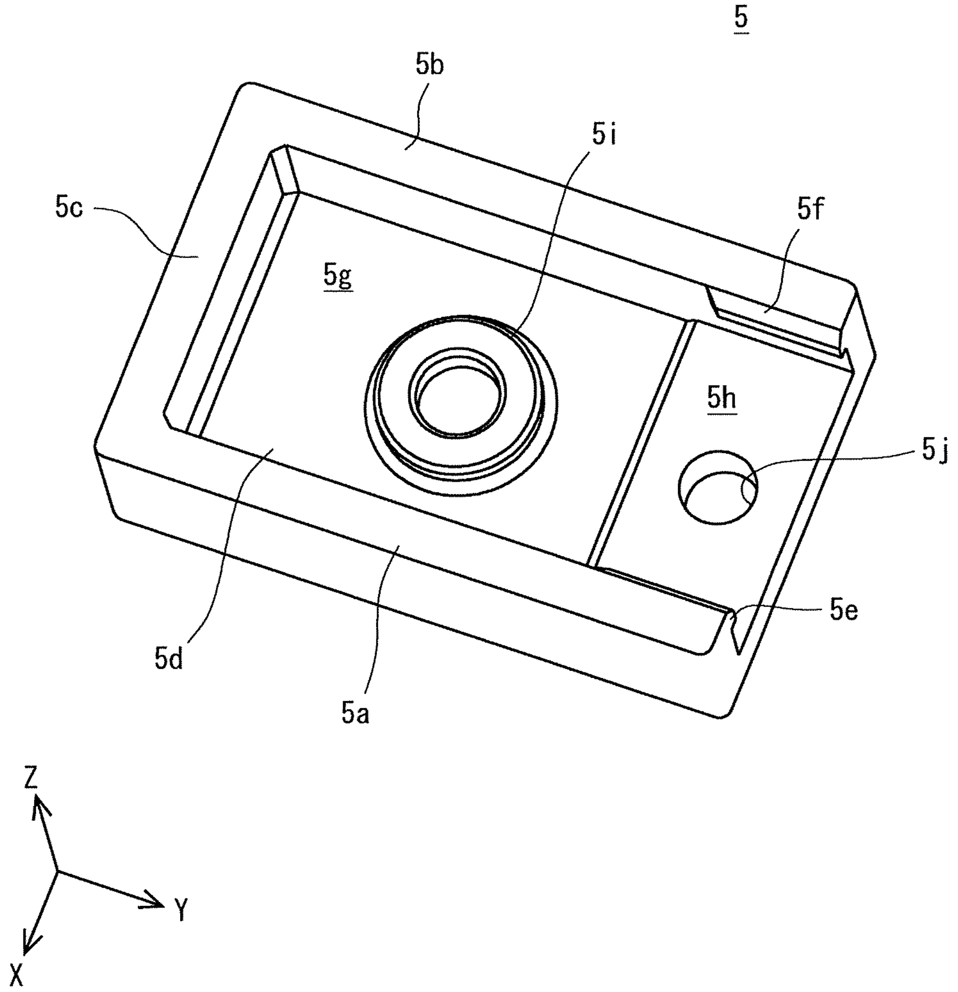
FIG. 12 is a perspective view of a housing of the terminal block of Embodiment 1 as seen from the positive side of the Z-axis.
Figure 13:
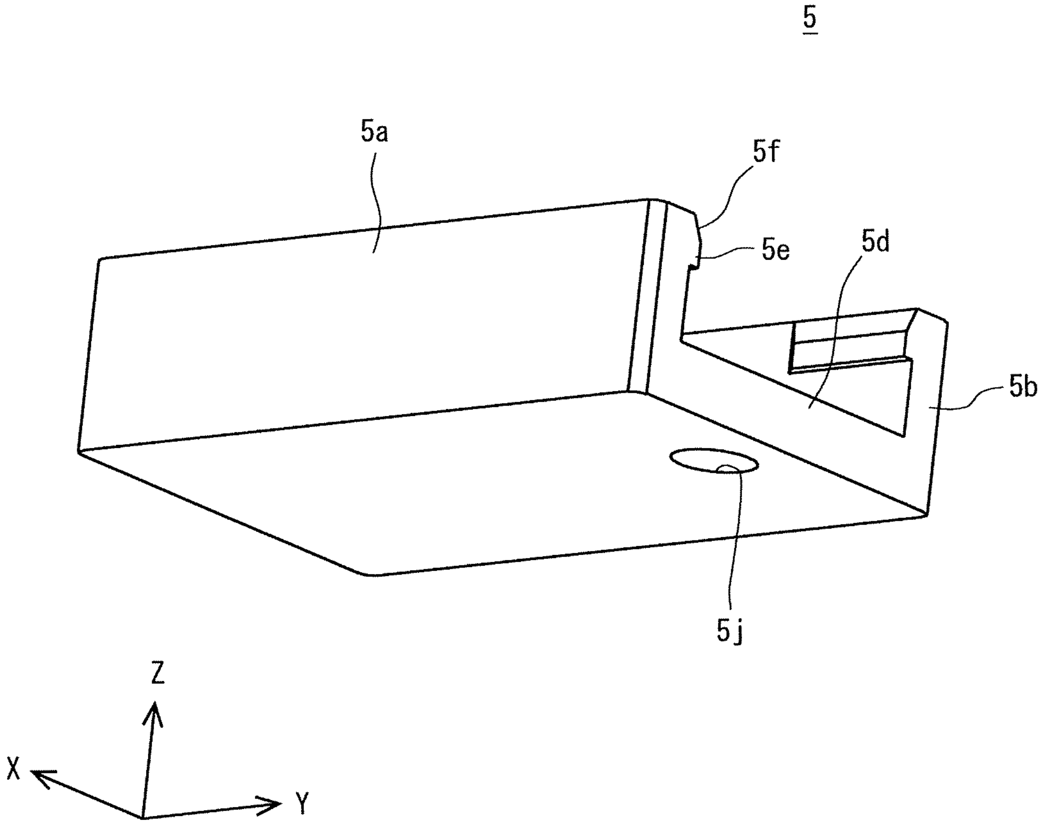
FIG. 13 is a perspective view of the housing of the terminal block of Embodiment 1 as seen from the negative side of the Z-axis.
Figure 14:
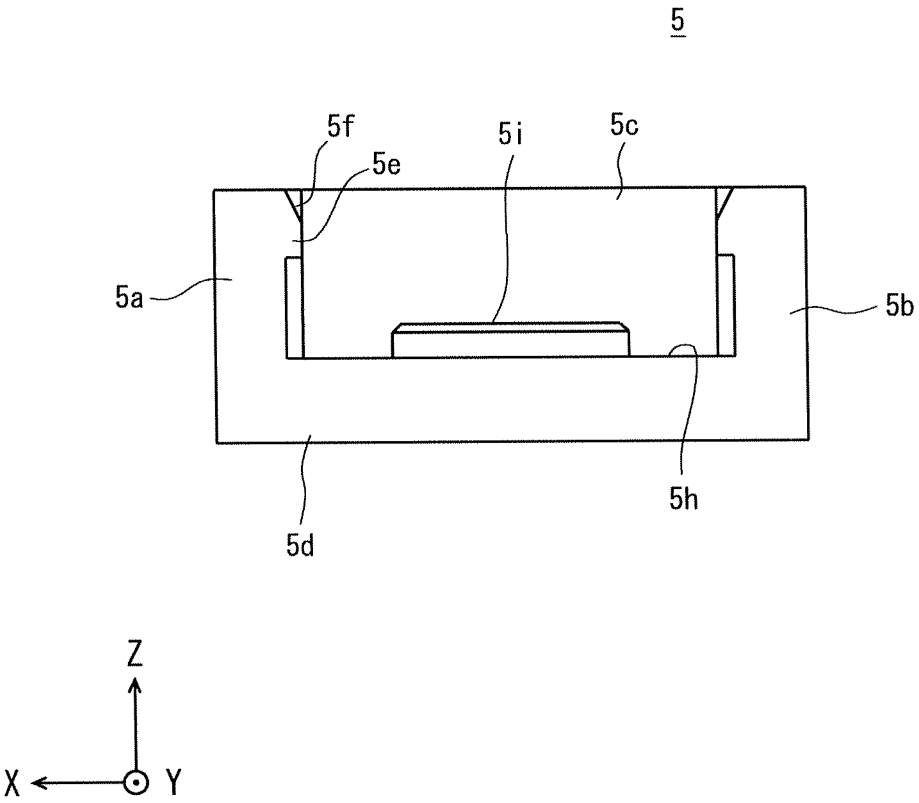
FIG. 14 is a view of the housing of the terminal block of Embodiment 1 as seen from the positive side of the Y-axis.

As shown in FIGS. 1 to 3, the housing 5 accommodates the terminal 4. The housing 5 is a molded product of an insulating material, such as resin, for example. FIG. 12 is a perspective view of the housing of the terminal block of the present embodiment as seen from the positive side of the Z-axis. FIG. 13 is a perspective view of the housing of the terminal block of the present embodiment as seen from the negative side of the Z-axis. FIG. 14 is a view of the housing of the terminal block of the present embodiment as seen from the positive side of the Y-axis.

As shown in FIGS. 12 to 14, the housing 5 has a hollow, substantially rectangular parallelepiped shape. The housing 5 is open on the positive side of the Y-axis and on the positive side of the Z-axis. That is, the housing 5 includes a first sidewall portion 5*a*, a second sidewall portion 5*b*, a third sidewall portion 5*c*, and a bottom portion 5*d*. The first sidewall portion 5*a* is in the shape of a plate that is substantially parallel with the YZ plane, and extends in the Y-axis direction.

As shown in FIGS. 12 to 14, the second sidewall portion 5*b* is disposed facing the first sidewall portion 5*a* in the X-axis direction, and is disposed on the negative side of the X-axis with respect to the first sidewall portion 5*a*. The second sidewall portion 5*b* is in the shape of a plate that is substantially parallel with the YZ plane, and extends in the Y-axis direction. As shown in FIG. 1, the gap between the first sidewall portion 5*a* and the second sidewall portion 5*b* in the X-axis direction is substantially equal to the width dimension of the end portion, which is located on the positive side of the Y-axis, of the second plate portion 6*b* of the terminal 4, for example.

At this time, as shown in FIGS. 12 to 14, first protruding portions 5*e*, which protrude to face each other in the X-axis direction, may be respectively formed on a corner portion, which is located on the positive side of the Y-axis and on the positive side of the Z-axis, of the first sidewall portion 5*a* and on a corner portion, which is located on the positive side of the Y-axis and on the positive side of the Z-axis, of the second sidewall portion 5*b*. Each first protruding portion 5*e* is substantially rectangular in shape as seen in the X-axis direction, for example.

As shown in FIG. 1, the thickness of each first protruding portions 5*e* in the X-axis direction may be substantially equal to the thickness of each upright portion 6*i* of the terminal 4 in the X-axis direction. In addition, an end portion, which is located on the positive side of the Z-axis, of each first protruding portion 5*e* may have formed thereon an inclined surface 5*f* that is inclined toward the other first protruding portions 5*e* along a direction toward the negative side of the Z-axis.

As shown in FIGS. 12 to 14, the third sidewall portion 5*c* is in the shape of a plate that is substantially parallel with the XZ plane, and extends in the X-axis direction. An end portion, which is located on the positive side of the X-axis, of the third sidewall portion 5*c* is continuous with an end portion, which is located on the negative side of the Y-axis, of the first sidewall portion 5*a*, while an end portion, which is located on the negative side of the X-axis, of the third sidewall portion 5*c* is continuous with an end portion, which is located on the negative side of the Y-axis, of the second sidewall portion 5*b*. Therefore, the first sidewall portion 5*a*, the second sidewall portion 5*b*, and the third sidewall portion 5*c* form a substantial C-shape as seen in the Z-axis direction.

As shown in FIGS. 12 and 13, the bottom portion 5*d* is substantially rectangular in shape as seen in the Z-axis direction. The bottom portion 5*d* is roughly in the shape of a plate that is substantially parallel with the XY plane. The first sidewall portion 5*a* protrudes to the positive side of the Z-axis from an end portion, which is located on the positive side of the X-axis, of the bottom portion 5*d*. The second sidewall portion 5*b* protrudes to the positive side of the Z-axis from an end portion, which is located on the negative side of the X-axis, of the bottom portion 5*d*. The third sidewall portion 5*c* protrudes to the positive side of the Z-axis from an end portion, which is located on the negative side of the Y-axis, of the bottom portion 5*d*.

As shown in FIG. 12, a face, which is located on the positive side of the Z-axis, of the bottom portion 5*d* has a stepped shape. That is, the face, which is located on the positive side of the Z-axis, of the bottom portion 5*d* has formed thereon a first portion 5*g* and a second portion 5*h* disposed on the positive side of the Z-axis with respect to the first portion 5*g*. The first portion 5*g* is substantially rectangular in shape as seen in the Z-axis direction, for example.

As shown in FIGS. 1 to 3, a portion, which is located on the negative side of the Y-axis, of the second plate portion 6*b* of the terminal 4 is disposed in a space on the positive side of the Z-axis with respect to the first portion 5*g*, as opposed to the end portion, which is located on the positive side of the Y-axis, of the second plate portion 6*b* of the terminal 4. As shown in FIG. 12, the first portion 5*g* has formed thereon a second protruding portion 5*i* protruding to the positive side of the Z-axis. The second protruding portion 5*i* has an annular shape as seen in the Z-axis direction, for example. The outside diameter of the second protruding portion 5*i* is smaller than the diameter of the second penetrating hole 6*g* of the terminal 4.

As shown in FIG. 12, the second portion 5*h* is disposed on the positive side of the Y-axis with respect to the first portion 5*g*, and is substantially rectangular in shape as seen in the Z-axis direction, or example. As shown in FIGS. 1 to 3, the end portion, which is located on the positive side of the Y-axis, of the second plate portion 6*b* of the terminal 4, is disposed in a space on the positive side of the Z-axis with respect to the second portion 5*h*.

As shown in FIGS. 3, 12 and 13, the second portion 5*h* has formed therein a penetrating hole 5*j* adapted to pass the bolt 10 that has been passed through the third penetrating hole 6*h* of the terminal 4. Herein, as shown in FIG. 1, the gap between the face, which is located on the positive side of the Z-axis, of the second portion 5*h* and an end portion, which is located on the negative side of the Z-axis, of each first protruding portion 5*e* may be substantially equal to the height of each upright portion 6*i* of the terminal 4 in the Z-axis direction.

In a state where the terminal 4 is accommodated in such a housing 5, as shown in FIG. 1, the end portion, which is located on the positive side of the Y-axis, of the second plate portion 6*b* of the terminal 4 is placed on the face, which is located on the positive side of the Z-axis, of the second portion 5*h* of the bottom portion 5*d* of the housing 5, and the upright portions 6*i* of the terminal 4 are inserted into a space between the second portion 5*h* and the first protruding portions 5*e*. At this time, the face, which is located on the positive side of the Z-axis, of the second portion 5*h* of the bottom portion 5*d* of the housing 5 functions as a determination plane for determining the height position of the terminal 4 in the housing 5 in the Z-axis direction.

As shown in FIG. 3, the third penetrating hole 6*h* of the terminal 4 and the penetrating hole 5*j* of the housing 5 are disposed substantially concentrically as seen in the Z-axis direction. In addition, the second protruding portion 5*i* of the housing 5 is passed through the second penetrating hole 6*g* of the terminal 4 in a state where there is a gap between the second plate portion 6*b* of the terminal 4 and the first portion 5*g* of the bottom portion 5*d* of the housing 5 in the Z-axis direction.

At this time, a gap that allows a portion, which is located on the negative side of the Y-axis, of the second plate portion 6*b* of the terminal 4 to deform in the X-axis direction, the Y-axis direction, and the Z-axis direction as opposed to the end portion, which is located on the positive side of the Y-axis, of the second plate portion 6*b* of the terminal 4 is formed between the terminal 4 and the inner peripheral side surface of the housing 5.

Next, an assembly flow for the terminal block 1 of the present embodiment will be described. First, the terminal 4 is pushed to the negative side of the Z-axis so that the terminal 4 is accommodated in the housing 5 from the positive side of the Z-axis and the upright portions 6*i* of the terminal 4 pass over the first protruding portions 5*e* of the housing 5 toward the negative side of the Z-axis. At this time, if each first protruding portion 5*e* has the inclined surface 5*f* formed thereon, the terminal 4 can be smoothly pushed to the negative side of the Z-axis.

Then, the upright portions 6*i* of the terminal 4 are inserted into the space between the second portion 5*h* and the first protruding portions 5*e* while the end portion, which is located on the positive side of the Y-axis, of the second plate portion 6*b* of the terminal 4 is placed on the face, which is located on the positive side of the Z-axis, of the second portion 5*h* of the bottom portion 5*d* of the housing 5. Along with this, the third penetrating hole 6*h* of the terminal 4 and the penetrating hole 5*j* of the housing 5 are disposed substantially concentrically as seen in the Z-axis direction while the second protruding portion 5*i* of the housing 5 is passed through the second penetrating hole 6*g* of the terminal 4. Accordingly, the assembly of the terminal block 1 is complete.

Herein, when the terminal block 1 is assembled, it is possible to allow the housing 5 to restrain the position of the terminal 4 in the X-axis direction and the Z-axis direction if the gap between the first sidewall portion 5*a* and the second sidewall portion 5*b* of the housing 5 in the X-axis direction is substantially equal to the width dimension of the end portion, which is located on the positive side of the Y-axis, of the second plate portion 6*b* of the terminal 4, and the gap between the face, which is located on the positive side of the Z-axis, of the second portion 5*h* of the bottom portion 5*d* of the housing 5 and the end portion, which is located on the negative side of the Z-axis, of each first protruding portion 5*e* is substantially equal to the height of each upright portion 6*i* of the terminal 4 in the Z-axis direction.

Next, a flow of electrically connecting the first conductive member 2 and the second conductive member 3 to the terminal block 1 of the present embodiment will be described. First, for example, the external thread portion 2*a* of the first conductive member 2 is screwed into the first connection portion 7 of the terminal 4 while the first conductive member 2 is passed through the first penetrating hole 6*f* of the terminal 4 from the positive side of the Z-axis. At this time, an end portion, which is located on the negative side of the Z-axis, of the external thread portion 2*a* of the first conductive member 2 may be passed through the fourth penetrating hole 6*k* of the terminal 4.

Meanwhile, for example, the second conductive member 3 is placed on the end portion, which is located on the positive side of the Y-axis, of the second plate portion 6*b* of the terminal 4 from the positive side of the Z-axis, and the penetrating hole 3*a* of the second conductive member 3, the third penetrating hole 6*h* of the terminal 4, and the penetrating hole 5*j* of the housing 5 are disposed substantially concentrically as seen in the Z-axis direction.

Then, the bolt 10 is passed through the penetrating hole 3*a* of the second conductive member 3, the third penetrating hole 6*h* of the terminal 4, and the penetrating hole 5*j* of the housing 5 from the positive side of the Z-axis, and is then screwed into an internal thread of an electronic component (not shown). Accordingly, the first conductive member 2 and the second conductive member 3 can be electrically connected to the terminal block 1, and also, the terminal block 1 can be fixed to the electronic component.

Figure 15:
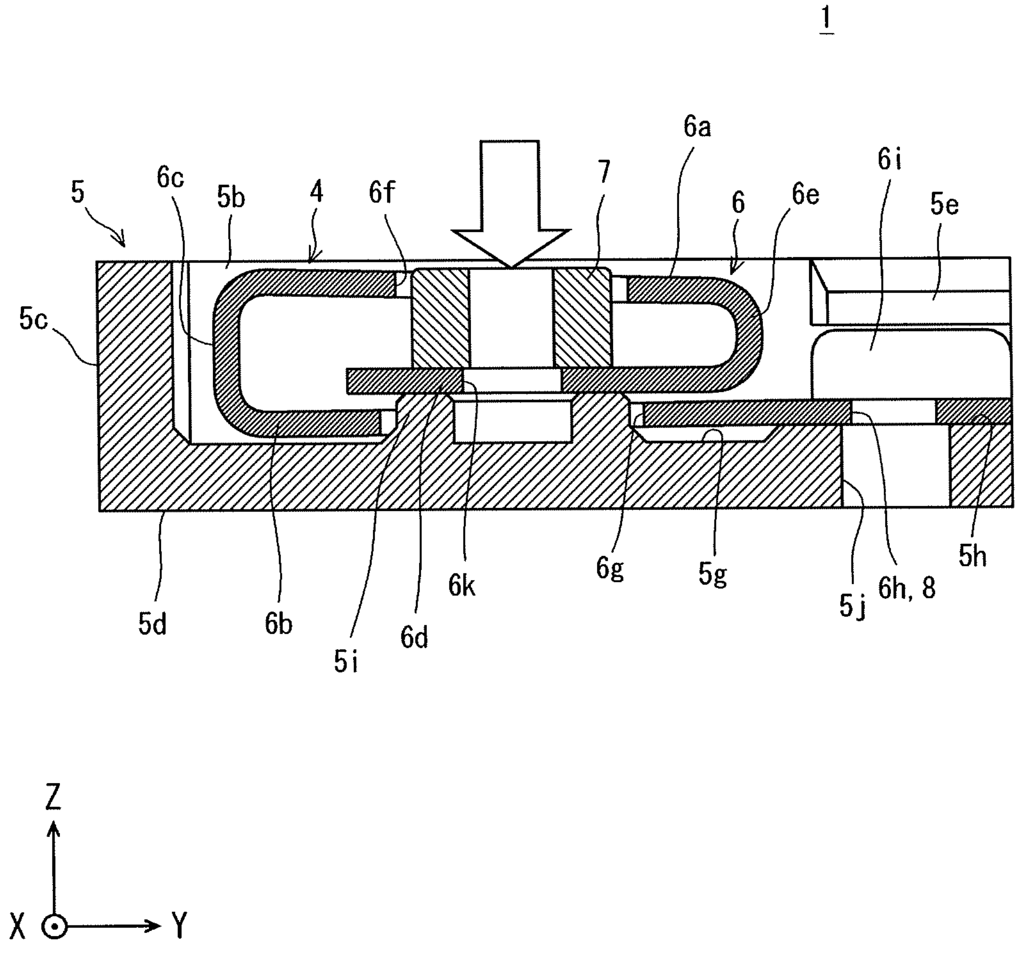
FIG. 15 is a view showing the state of a terminal in the terminal block of Embodiment 1 that has deformed toward the negative side of the Z-axis, as seen from the positive side of the X-axis.
Figure 16:
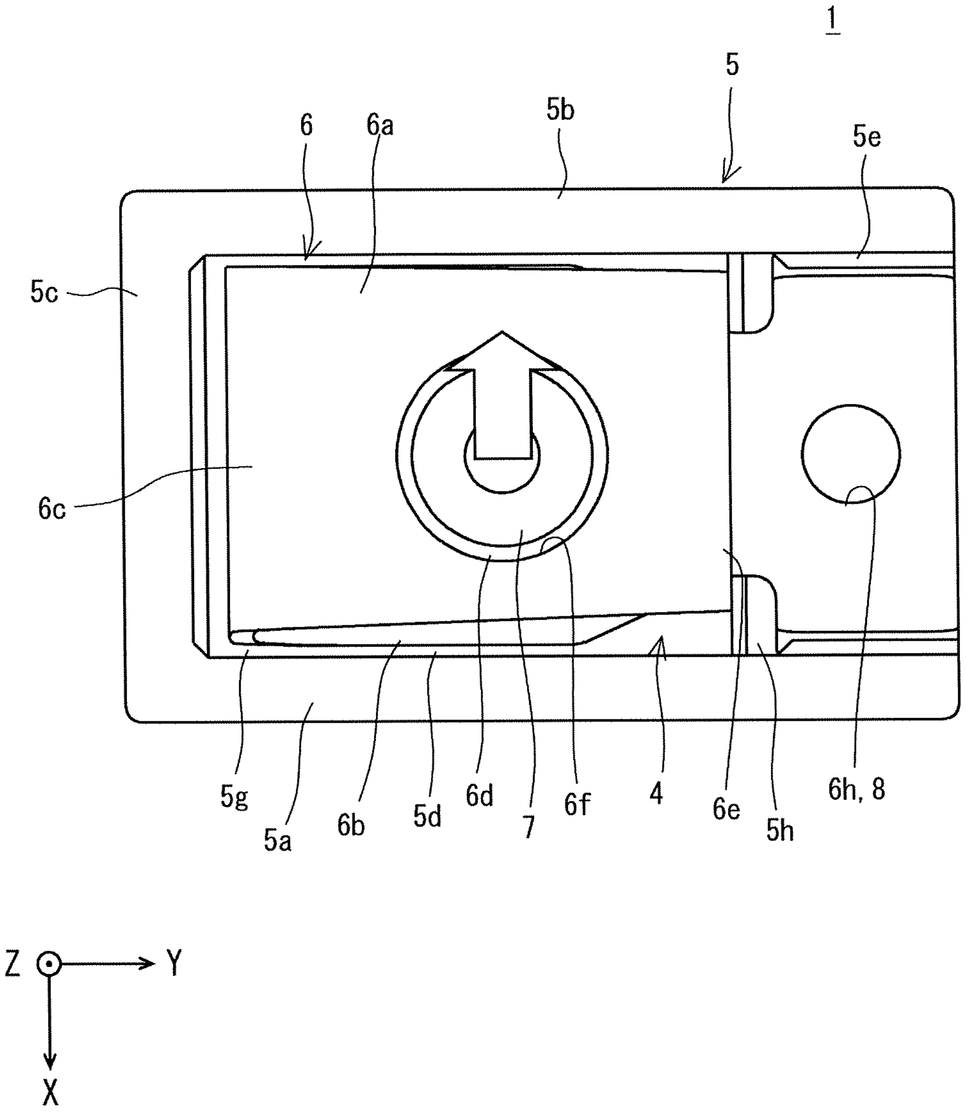
FIG. 16 is a view showing the state of the terminal in the terminal block of Embodiment 1 that has deformed toward the negative side of the X-axis, as seen from the positive side of the Z-axis.
Figure 17:
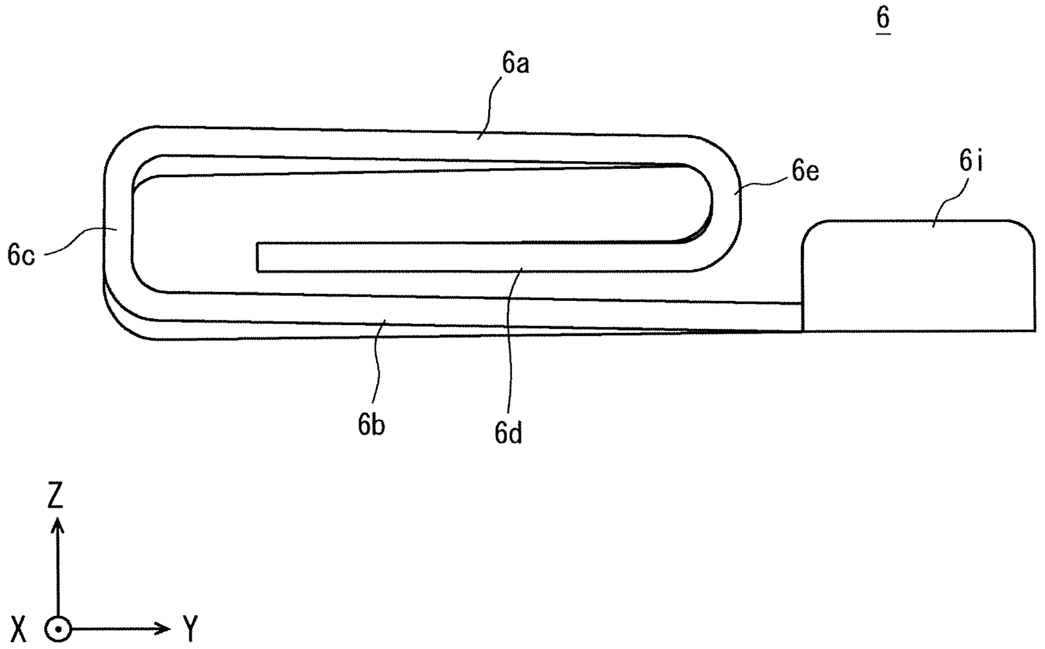
FIG. 17 is a view showing the state of the terminal body in the terminal block of Embodiment 1 that has deformed toward the negative side of the X-axis, as seen from the positive side of the X-axis.
Figure 18:
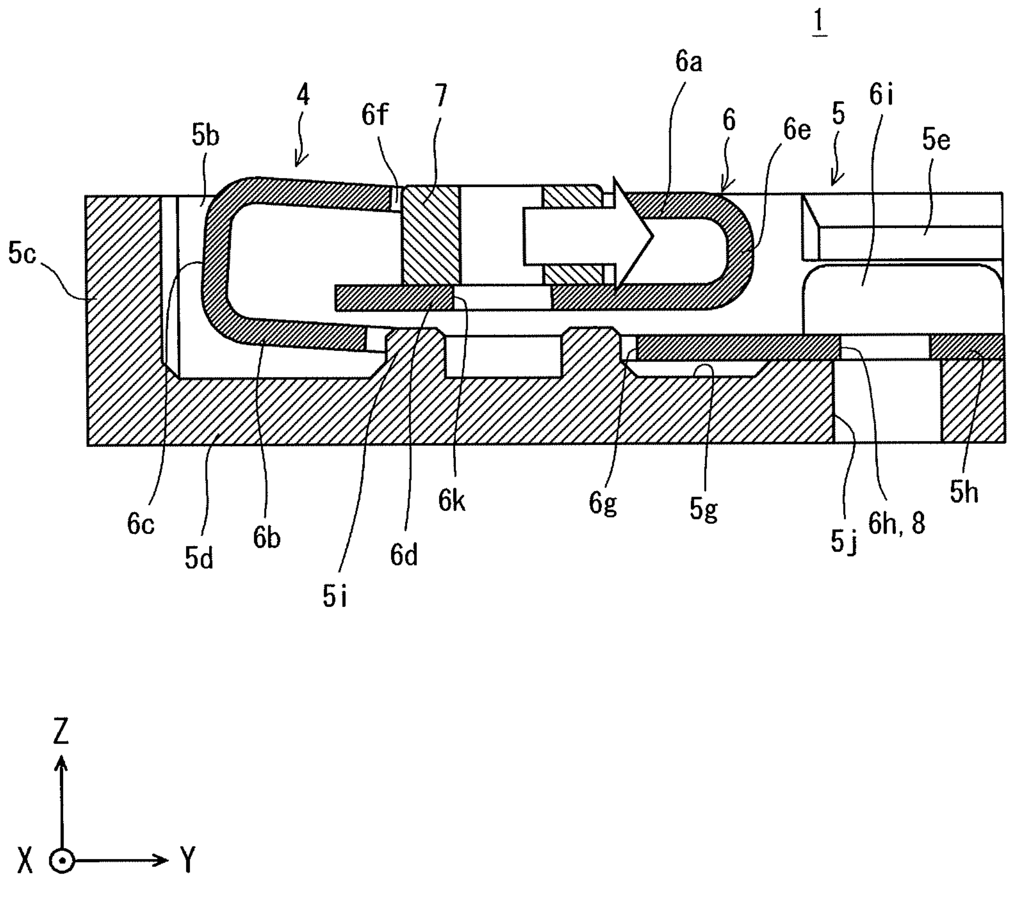
FIG. 18 is a view showing the state of the terminal in the terminal block of Embodiment 1 that has deformed toward the positive side of the Y-axis, as seen from the positive side of the X-axis.

Next, the deformed state of the terminal 4 in the terminal block 1 of the present embodiment will be described. FIG. 15 is a view showing the state of the terminal in the terminal block of the present embodiment that has deformed toward the negative side of the Z-axis, as seen from the positive side of the X-axis. FIG. 16 is a view showing the state of the terminal in the terminal block of the present embodiment that has deformed toward the negative side of the X-axis, as seen from the positive side of the Z-axis. FIG. 17 is a view showing the state of the terminal body in the terminal block of the present embodiment that has deformed toward the negative side of the X-axis, as seen from the positive side of the X-axis. FIG. 18 is a view showing the state of the terminal in the terminal block of the present embodiment that has deformed toward the positive side of the Y-axis, as seen from the positive side of the X-axis.

As shown in FIG. 15, the third plate portion 6*d* of the terminal 4 is pushed to the negative side of the Z-axis when a force acts on the first connection portion 7 of the terminal 4 toward the negative side of the Z-axis and thus causes the first connection portion 7 to be displaced to the negative side of the Z-axis. Along with this, the first plate portion 6*a* of the terminal 4 deforms such that it is inclined toward the negative side of the Z-axis along the direction toward the positive side of the Y-axis, and also, the second plate portion 6*b* of the terminal 4 deforms such that it is inclined toward the negative side of the Z-axis along the direction toward the negative side of the Y-axis.

In this manner, since the first plate portion 6*a* and the second plate portion 6*b* deform in different directions, such deformations are cancelled out each other. This allows the third plate portion 6*d* to be maintained in the state substantially parallel with the XY plane. At this time, the third plate portion 6*d* may contact the second protruding portion 5*i* of the housing 5 so that the deformation of the third plate portion 6*d* toward the negative side of the Z-axis is restricted.

As shown in FIGS. 16 and 17, the third plate portion 6*d* of the terminal 4 is pushed to the negative side of the X-axis when a force acts on the first connection portion 7 of the terminal 4 toward the negative side of the X-axis and thus causes the first connection portion 7 to be displaced to the negative side of the X-axis. Along with this, the first plate portion 6*a* deforms such that it rotates counterclockwise, and the second plate portion 6*b* deforms such that it rotates clockwise as seen from the positive side of the Z-axis.

Then, as shown in FIG. 17, each of the first plate portion 6*a* and the second plate portion 6*b* of the terminal 4 is twisted clockwise along the direction toward the negative side of the Y-axis, and the third plate portion 6*d* of the terminal 4 is twisted counterclockwise along the direction toward the negative side of the Y-axis as seen from the positive side of the Y-axis.

In this manner, since the first plate portion 6*a* and the second plate portion 6*b*, and the third plate portion 6*d* are twisted in different directions, such twists are cancelled out each other. This allows the third plate portion 6*d* to be maintained in the state substantially parallel with the XY plane.

At this time, if the first plate portion 6*a* of the terminal 4 has a substantially trapezoidal shape such that its width dimension in the X-axis direction decreases along the direction toward the positive side of the Y-axis, it is possible to, when the first connection portion 7 is displaced in the X-axis direction, prevent the first plate portion 6*a* from coming into contact with the housing 5, and thus allow the first connection portion 7 to be favorably displaced in the X-axis direction.

As shown in FIG. 18, the third plate portion 6*d* of the terminal 4 is pushed to the positive side of the Y-axis when a force acts on the first connection portion 7 of the terminal 4 toward the positive side of the Y-axis and thus causes the first connection portion 7 to be displaced to the positive side of the Y-axis. As the third plate portion 6*d* of the terminal 4 is pushed to the positive side of the Y-axis, the first plate portion 6*a* and the second plate portion 6*b* deform such that they are inclined toward the positive side of the Z-axis along the direction toward the negative side of the Y-axis. In addition, the third plate portion 6*d* of the terminal 4 deforms such that it is inclined toward the negative side of the Z-axis along the direction toward the negative side of the Y-axis.

In this manner, since the first plate portion 6*a* and the second plate portion 6*b*, and the third plate portion 6*d* deform in different directions, such deformations are cancelled out each other. This allows the third plate portion 6*d* to be maintained in the state substantially parallel with the XY plane.

The terminal block 1 of the present embodiment is configured such that the terminal body 6 is deformable in all directions including the X-axis direction, the Y-axis direction, and the Z-axis direction, and thus is able to absorb the positional displacement of the first conductive member 2 with respect to the terminal block 1. Therefore, the terminal block 1 of the present embodiment allows the first conductive member 2 to be favorably connected to the terminal block 1.

Furthermore, the terminal body 6 of the present embodiment is shaped such that the first plate portion 6*a*, the second plate portion 6*b*, and the third plate portion 6*d* are disposed to overlap in the Z-axis direction such that they are substantially parallel with one another. Therefore, the deformations of the plate portions of the terminal body 6 can be cancelled out each other, and the third plate portion 6*d* can thus be maintained substantially parallel with the XY plane as described above. Thus, the first conductive member 2 can be easily connected to the first connection portion 7 of the terminal 4. That is, the terminal block 1 of the present embodiment has high connectivity to the first conductive member 2.

In addition, as described above, the terminal body 6 of the present embodiment is shaped such that it is bent into a flat spiral shape so as to allow the third plate portion 6*d*, the second coupling portion 6*e*, the first plate portion 6*a*, the first coupling portion 6*c*, and the second plate portion 6*b* to be continuous. That is, since the terminal body 6 is bent to have the third plate portion 6*d* located on the inner side thereof, it is possible to absorb the positional displacement of the first conductive member 2 with respect to the terminal block 1 while avoiding an increase in the size of the terminal body 6, and further, the terminal block 1. This contributes to reducing the size of the terminal block 1.

In addition, the terminal body 6 of the present embodiment can be easily produced by bending the belt-like material 9 into a flat spiral shape.

Embodiment 2

Figure 19:
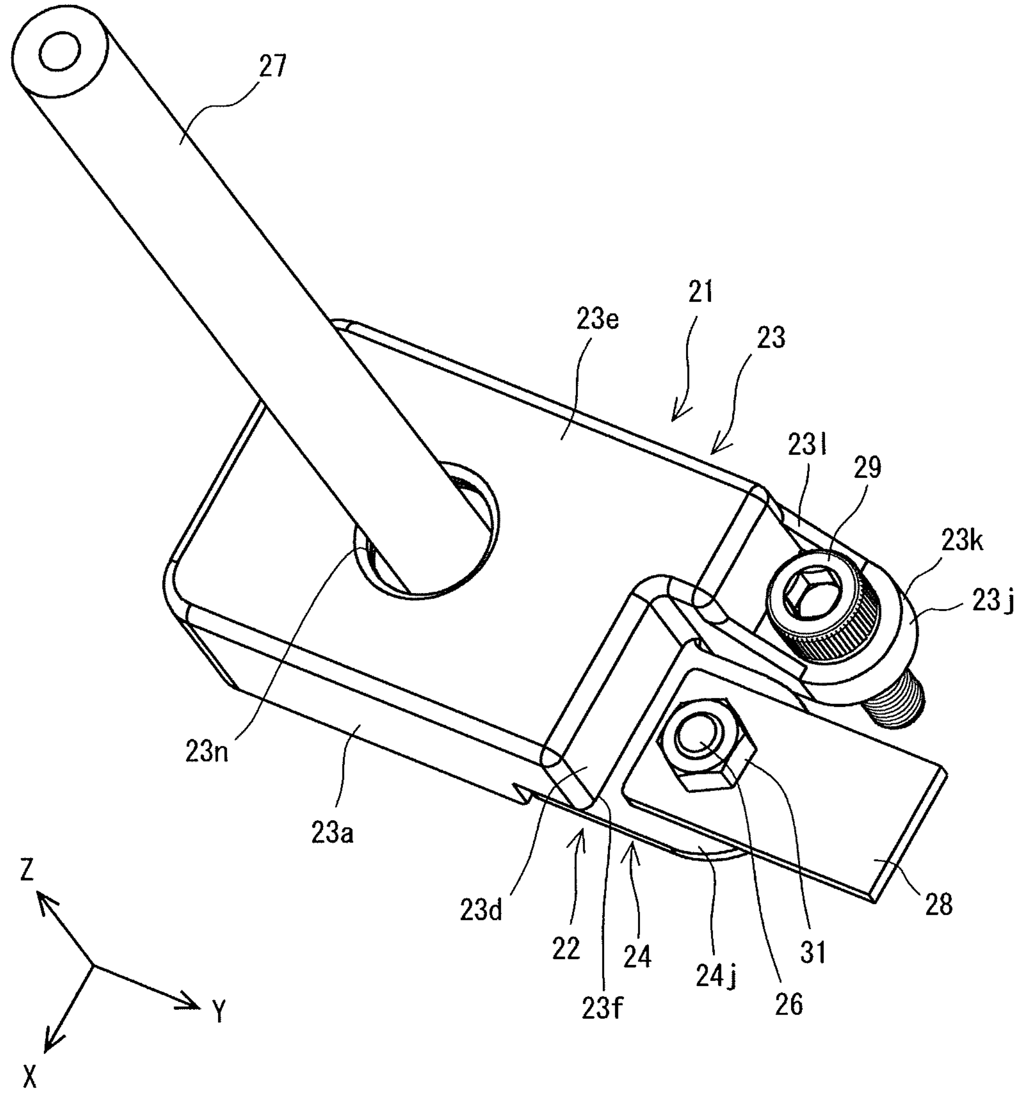
FIG. 19 is a perspective view of a terminal block of Embodiment 2 as seen from the positive side of the Z-axis.
Figure 20:
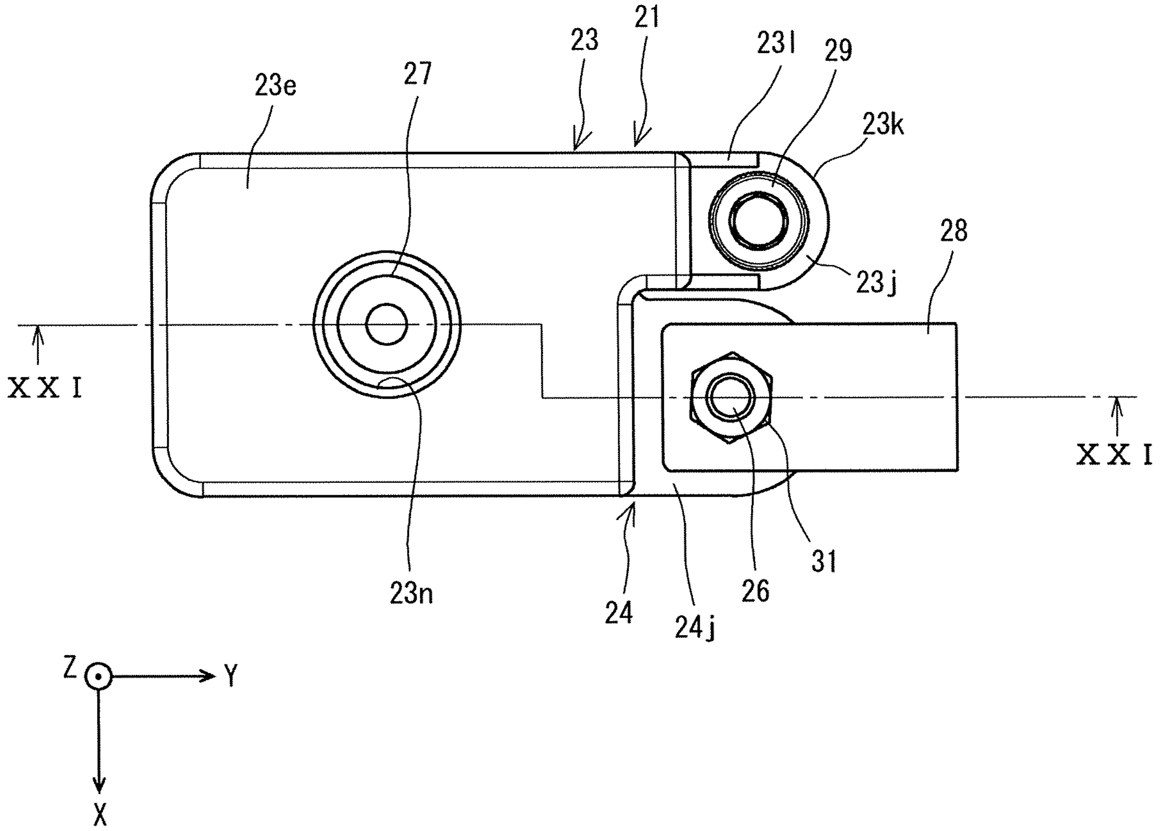
FIG. 20 is a view of the terminal block of Embodiment 2 as seen from the positive side of the Z-axis.
Figure 21:
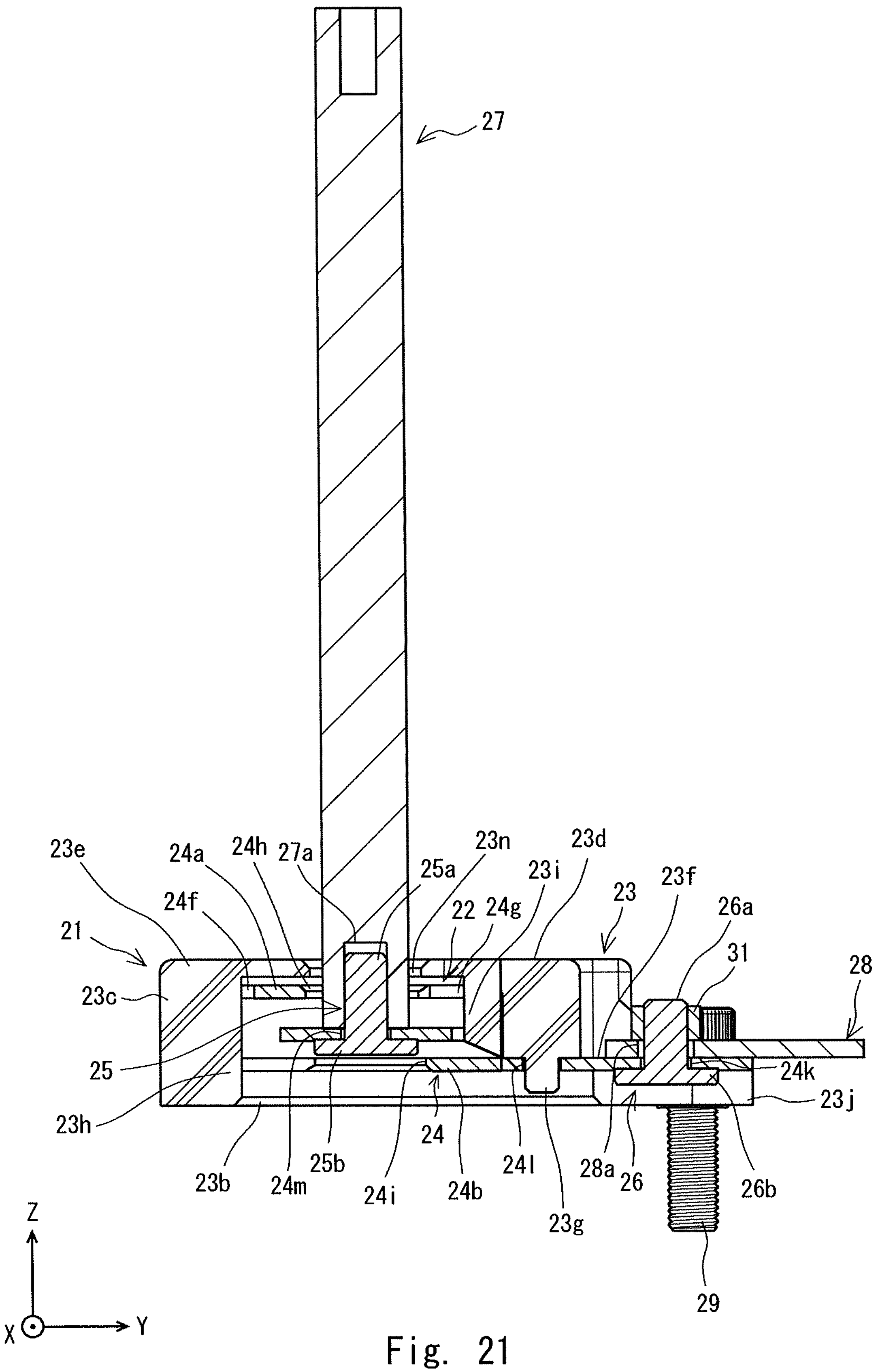
FIG. 21 is a cross-sectional view along line XXI-XXI in FIG. 20.
Figure 22:
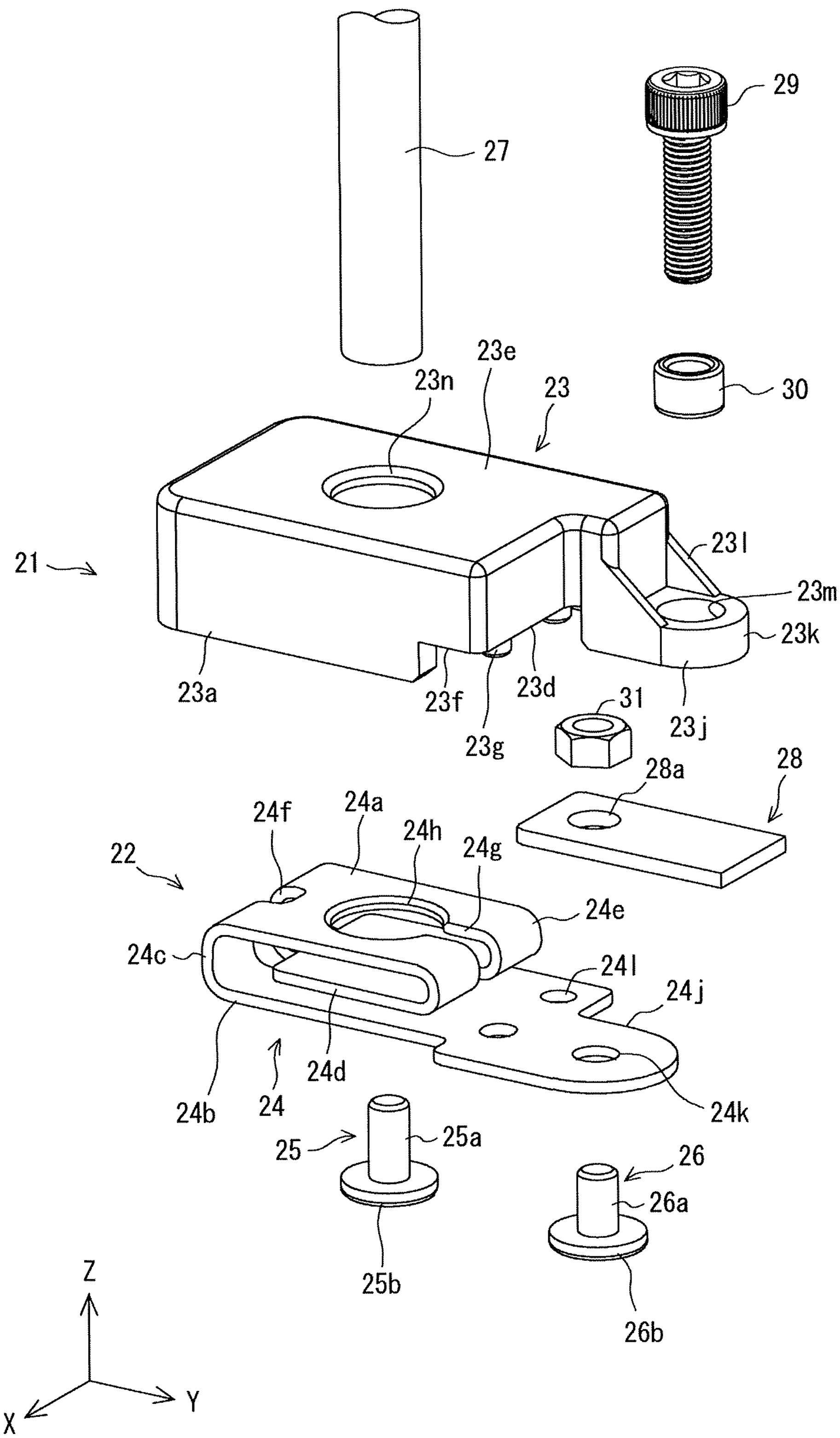
FIG. 22 is an exploded perspective view of the terminal block of Embodiment 2.
Figure 23:
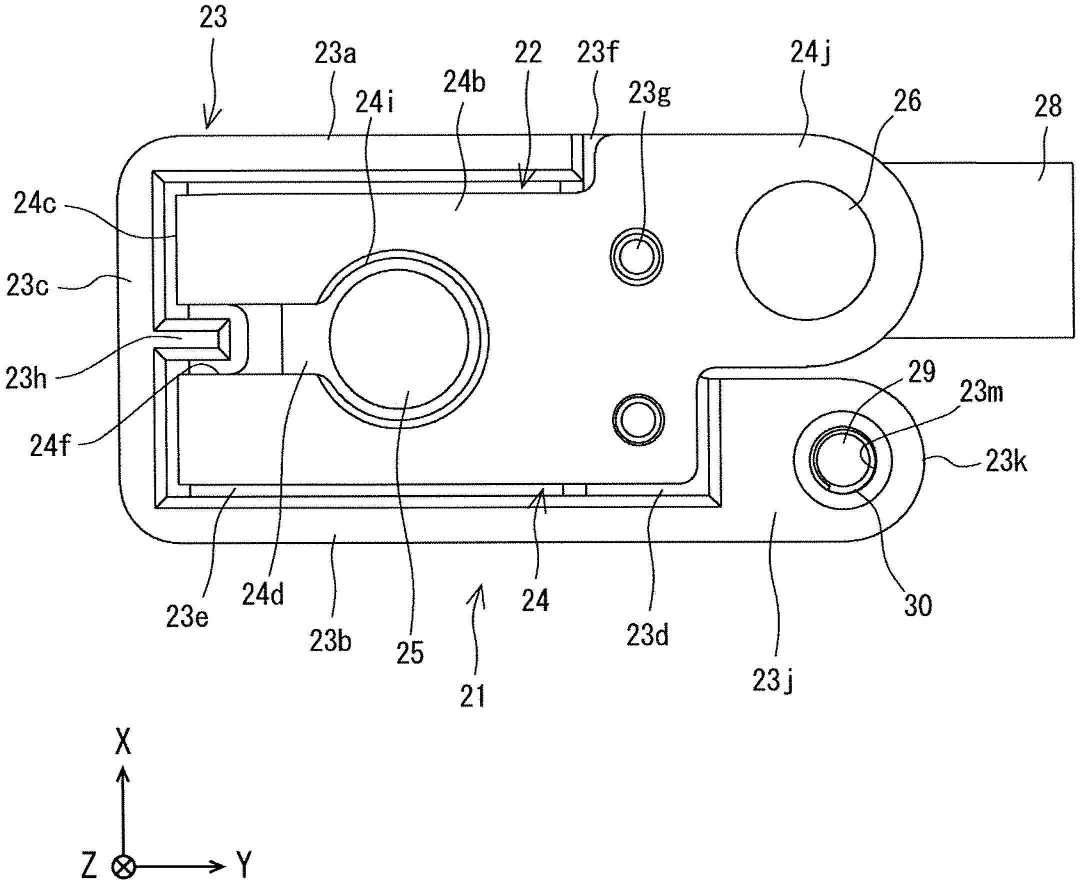
FIG. 23 is a view of the terminal block of Embodiment 2 as seen from the negative side of the Z-axis.

The configuration of a terminal block of the present embodiment will be described. FIG. 19 is a perspective view of the terminal block of the present embodiment as seen from the positive side of the Z-axis. FIG. 20 is a view of the terminal block of the present embodiment as seen from the positive side of the Z-axis. FIG. 21 is a cross-sectional view along line XXI-XXI in FIG. 20. FIG. 22 is an exploded perspective view of the terminal block of the present embodiment. FIG. 23 is a view of the terminal block of the present embodiment as seen from the negative side of the Z-axis. Note that a terminal block 21 of the present embodiment has substantially the same configuration as the terminal block 1 of Embodiment 1. Thus, the overlapped description will be omitted.

As shown in FIGS. 19 to 23, the terminal block 21 includes a terminal 22 and a housing 23. The terminal 22 includes a terminal body 24, a first connection portion 25, and a second connection portion 26. The terminal body 24 is also a bent body obtained by bending a conductive material, such as a belt-like metallic plate, into a substantial spiral shape.

Figure 24:
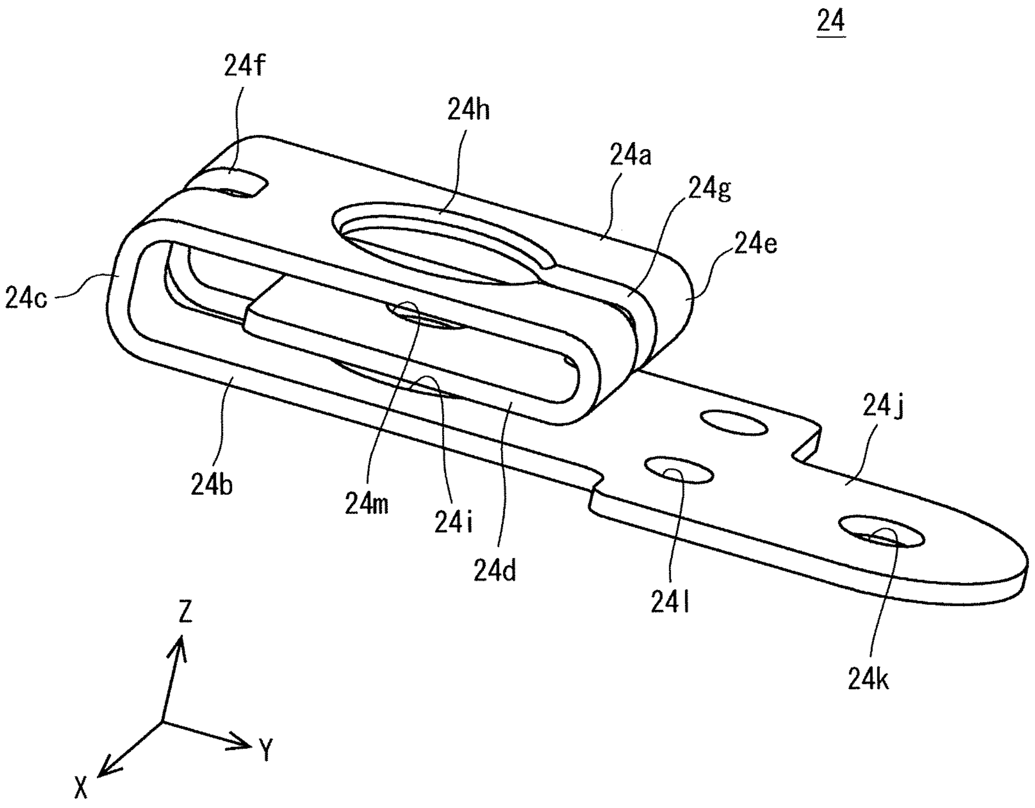
FIG. 24 is a perspective view of a terminal body in the terminal block of Embodiment 2 as seen from the positive side of the Z-axis.
Figure 25:
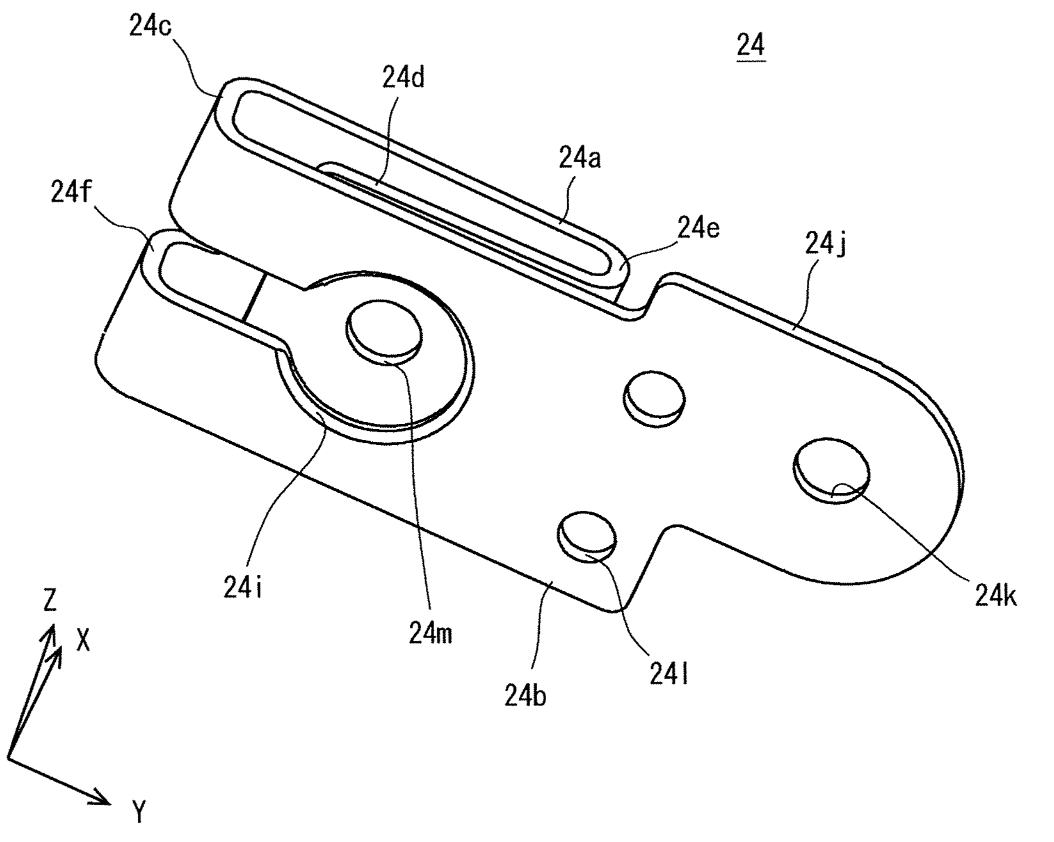
FIG. 25 is a perspective view of the terminal body in the terminal block of Embodiment 2 as seen from the negative side of the Z-axis.
Figure 26:
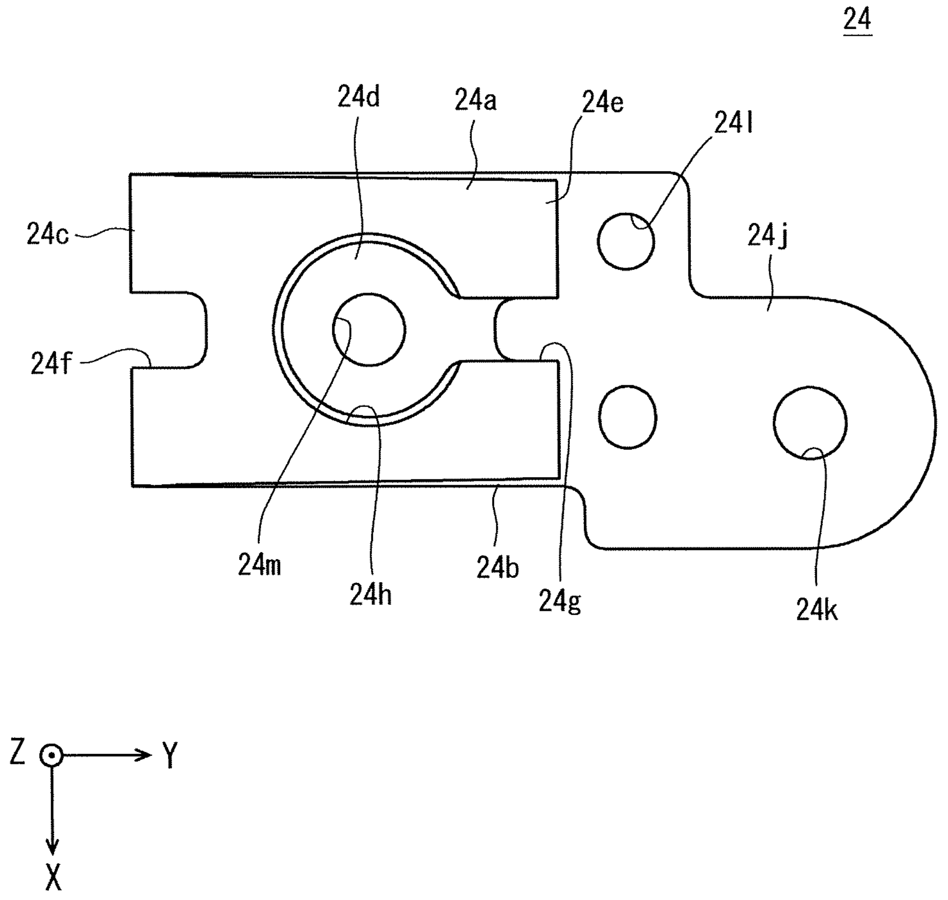
FIG. 26 is a view of the terminal body in the terminal block of Embodiment 2 as seen from the positive side of the Z-axis.
Figure 27:
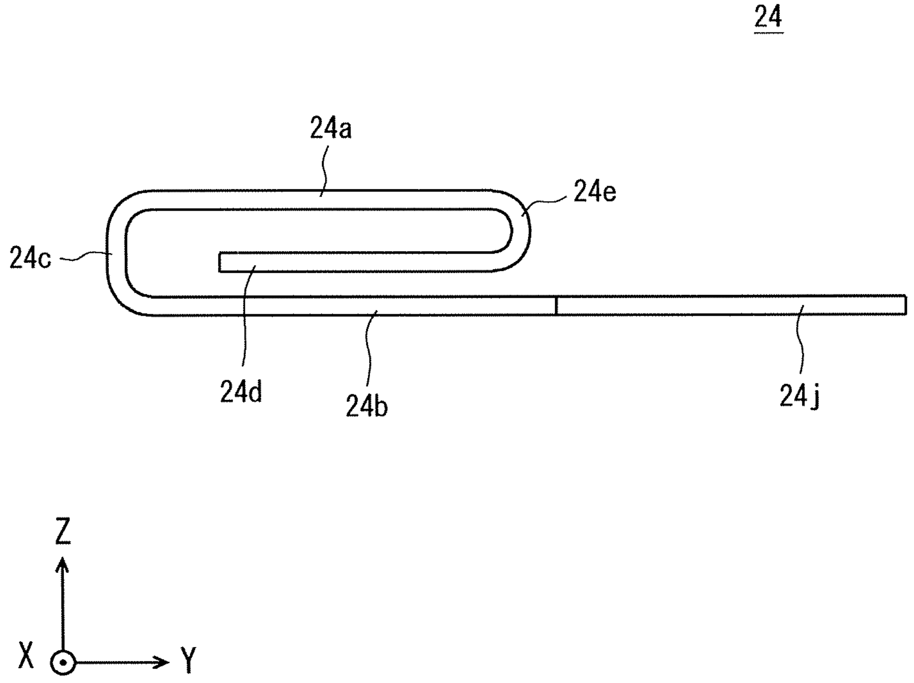
FIG. 27 is a view of the terminal body in the terminal block of Embodiment 2 as seen from the positive side of the X-axis.

FIG. 24 is a perspective view of the terminal body in the terminal block of the present embodiment as seen from the positive side of the Z-axis. FIG. 25 is a perspective view of the terminal body in the terminal block of the present embodiment as seen from the negative side of the Z-axis. FIG. 26 is a view of the terminal body in the terminal block of the present embodiment as seen from the positive side of the Z-axis. FIG. 27 is a view of the terminal body in the terminal block of the present embodiment as seen from the positive side of the X-axis.

As shown in FIGS. 24 to 27, the terminal body 24 includes a first plate portion 24*a*, a second plate portion 24*b*, a first coupling portion 24*c*, a third plate portion 24*d*, and a second coupling portion 24*e*, and further includes a first slit portion 24*f* and a second slit portion 24*g*.

As shown in FIGS. 24 to 26, the first slit portion 24*f* is formed continuously in the first plate portion 24*a*, the first coupling portion 24*c*, and the second plate portion 24*b* so as to reach an end portion, which is located on the negative side of the Y-axis, of the second plate portion 24*b* from an end portion, which is located on the negative side of the Y-axis, of the first plate portion 24*a* via the first coupling portion 24*c*.

For example, as shown in FIGS. 24 to 26, the first slit portion 24*f* is disposed on a line passing through the surfaces of the first plate portion 24*a*, the first coupling portion 24*c*, and the second plate portion 24*b*, and connecting the center of a first penetrating hole 24*h* in the first plate portion 24*a* to the center of a second penetrating hole 24*i* in the second plate portion 24*b*.

Herein, as shown in FIGS. 24 to 26, an end portion, which is located on the positive side of the Y-axis, of the second plate portion 24*b* has a bent portion 24*j* formed thereon. The bent portion 24*j* is substantially L-shaped as seen in the Z-axis direction, for example, and extends to the positive side of the X-axis, and further extends to the positive side of the Y-axis.

As shown in FIGS. 24 to 26, an end portion on the distal end side (i.e., on the positive side of the Y-axis) of the bent portion 24*j* has a third penetrating hole 24*k* formed therein. In addition, an end portion on the proximal side (i.e., on the negative side of the Y-axis) of the bent portion 24*j* has formed therein fourth penetrating holes 24*l* that are spaced apart in the X-axis direction.

As shown in FIGS. 24 to 26, for example, the second slit portion 24*g* is formed continuously in the first plate portion 24*a*, the second coupling portion 24*e*, and the third plate portion 24*d* so as to reach an end portion, which is located on the positive side of the Y-axis, of the third plate portion 24*d* from the first penetrating hole 24*h* of the first plate portion 24*a* via the second coupling portion 24*e*.

As shown in FIGS. 24 to 26, for example, the second slit portion 24*g* is disposed on a line passing through the surfaces of the first plate portion 24*a*, the second coupling portion 24*e*, and the third plate portion 24*d*, and connecting the center of the first penetrating hole 24*h* in the first plate portion 24*a* to the center of a fifth penetrating hole 24*m* in the third plate portion 24*d*.

As shown in FIG. 21, the first connection portion 25 includes a bolt that is a representative example of a connection member adapted to be screwed into an internal thread portion 27*a* formed in an end portion, which is located on the negative side of the Z-axis, of a first conductive member 27. The first connection portion 25 is fixed to the third plate portion 24*d* of the terminal body 24 by being sandwiched from the opposite sides of the first connection portion 25 in the Z-axis direction with a crimp jig, which has been passed through the first penetrating hole 24*h* and the second penetrating hole 24*i* of the terminal body 24, in a state where a shaft portion 25*a* of the first connection portion 25 is passed through the fifth penetrating hole 24*m* of the terminal body 24 from the negative side of the Z-axis.

As shown in FIG. 21, the second connection portion 26 includes a bolt that is a representative example of a connection member adapted to be passed through a penetrating hole 28*a* formed in an end portion, which is located on the negative side of the Y-axis, of a second conductive member 28 and through the third penetrating hole 24*k* of the terminal body 24. The second connection portion 26 is fixed to the second plate portion 24*b* of the terminal body 24 by being sandwiched from the opposite sides of the second connection portion 26 in the Z-axis direction with a crimp jig in a state where a shaft portion 26*a* of the second connection portion 26 is passed through the third penetrating hole 24*k* of the terminal body 24 from the negative side of the Z-axis.

Figure 28:
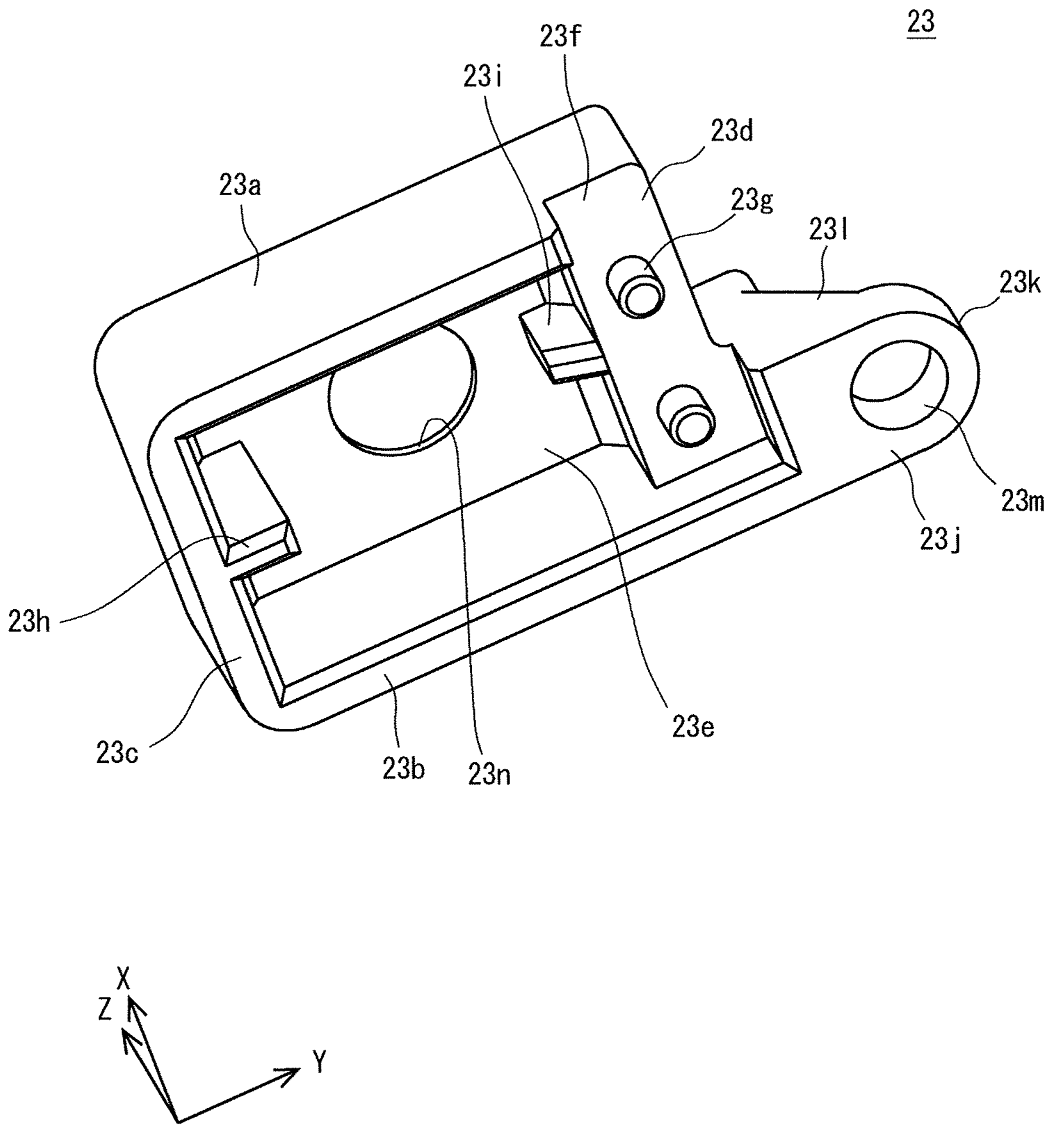
FIG. 28 is a perspective view of a housing of the terminal block of Embodiment 2 as seen from the negative side of the Z-axis.
Figure 29:
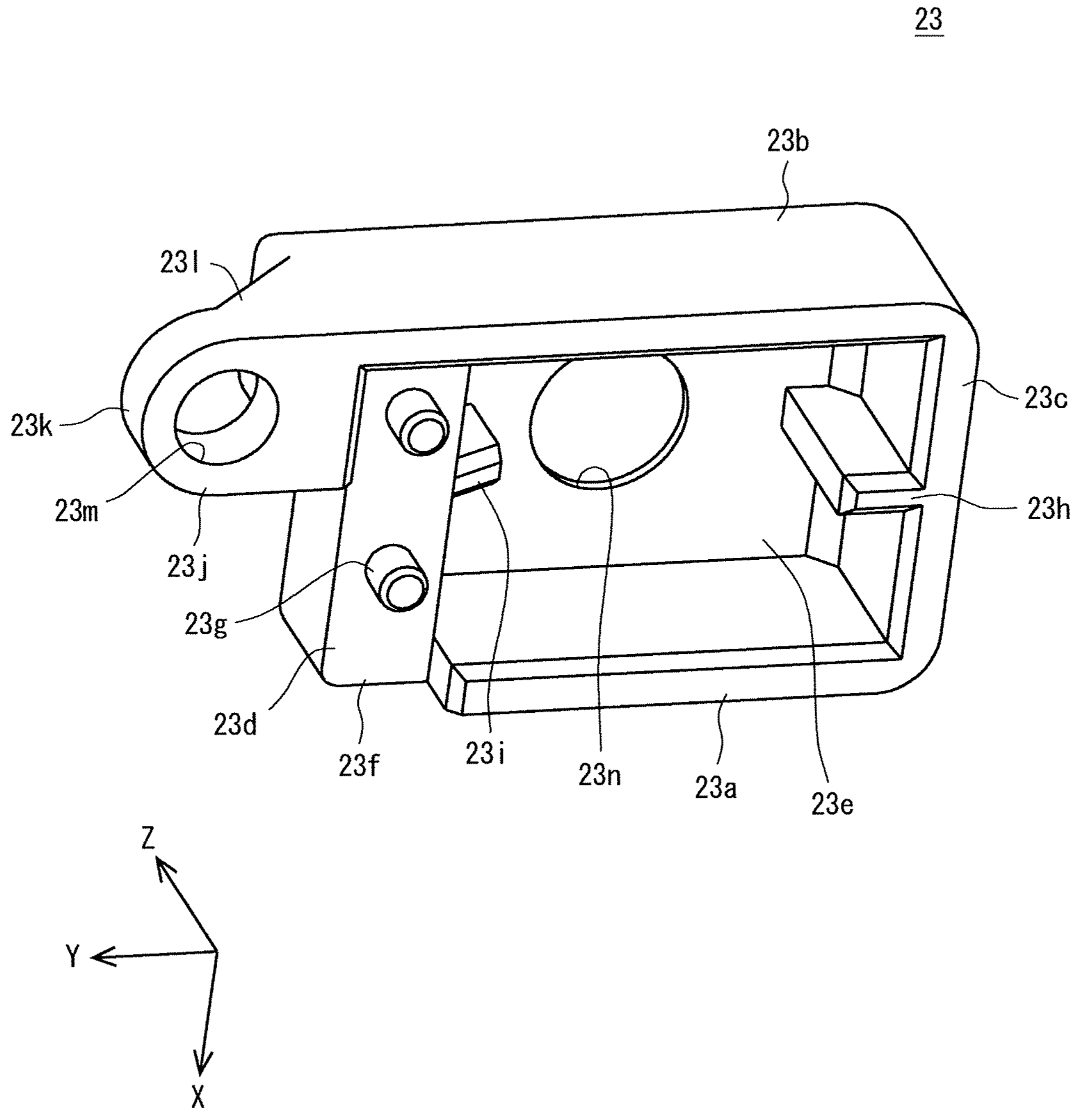
FIG. 29 is a different perspective view of the housing of the terminal block of Embodiment 2 as seen from the negative side of the Z-axis.
Figure 30:
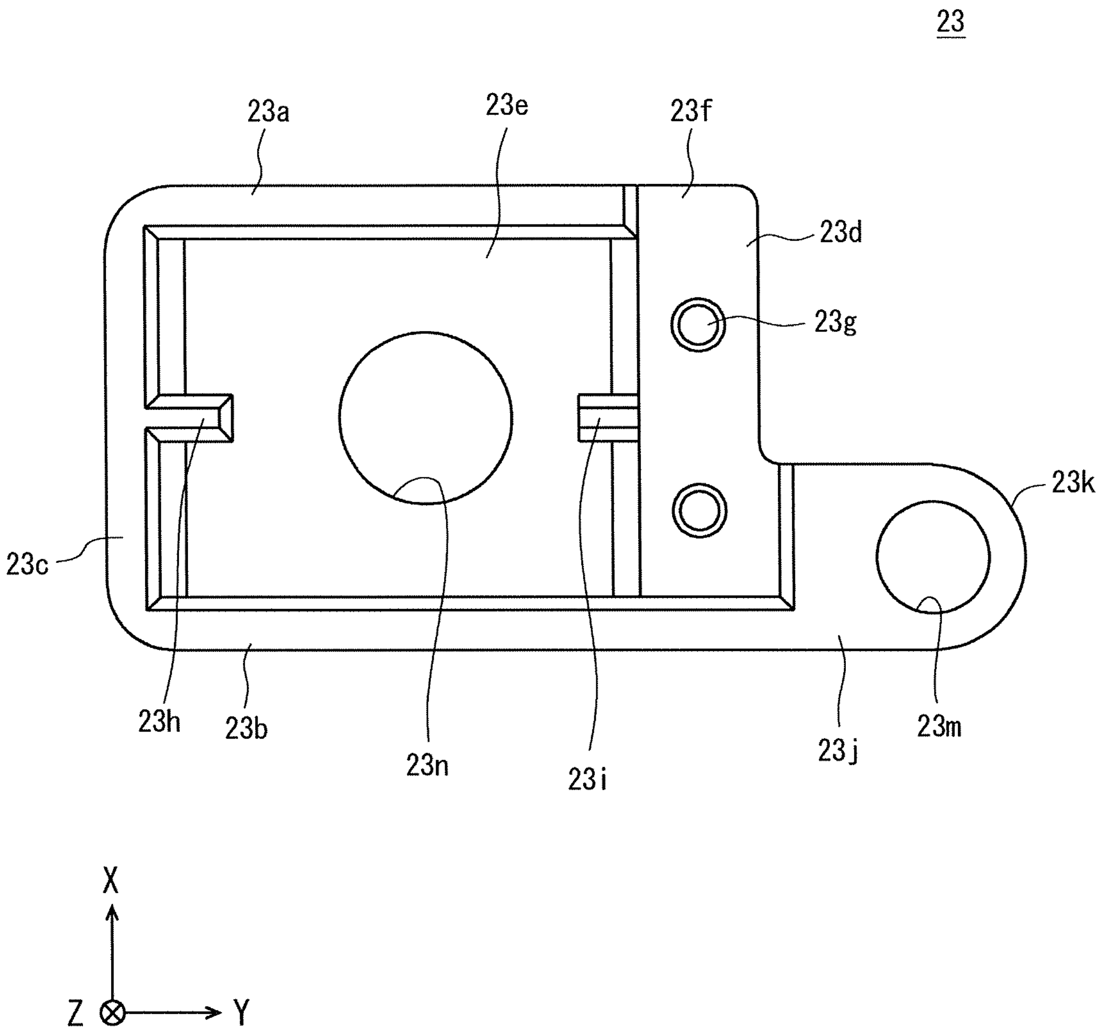
FIG. 30 is a view of the housing of the terminal block of Embodiment 2 as seen from the negative side of the Z-axis.

As shown in FIGS. 21 and 23, the housing 23 accommodates the terminal 22. FIG. 28 is a perspective view of the housing of the terminal block of the present embodiment as seen from the negative side of the Z-axis. FIG. 29 is a different perspective view of the housing of the terminal block of the present embodiment as seen from the negative side of the Z-axis. FIG. 30 is a view of the housing of the terminal block of the present embodiment as seen from the negative side of the Z-axis.

As shown in FIGS. 28 to 30, the housing 23 has a roughly hollow, substantially rectangular parallelepiped shape. The housing 23 is open on the negative side of the Z-axis. That is, the housing 23 includes a first sidewall portion 23*a*, a second sidewall portion 23*b*, a third sidewall portion 23*c*, a fourth sidewall portion 23*d*, and a ceiling portion 23*e*.

As shown in FIGS. 28 to 30, the first sidewall portion 23*a* and the second sidewall portion 23*b* are disposed facing each other in the X-axis direction. The third sidewall portion 23*c* and the fourth sidewall portion 23*d* are disposed facing each other in the Y-axis direction.

As shown in FIGS. 19 and 23, an end portion, which is located on the negative side of the Z-axis, of the fourth sidewall portion 23*d* disposed on the positive side of the Y-axis has formed therein a cutout portion 23*f* for allowing the distal end portion of the bent portion 24*j* of the terminal 22 to protrude to the positive side of the Y-axis from the housing 23. As shown in FIGS. 28 to 30, a face, which is located on the positive side of the Z-axis, of the cutout portion 23*f* is a flat face substantially parallel with the XY plane, for example.

As shown in FIGS. 28 to 30, bosses 23*g*, which are adapted to be passed through the respective fourth penetrating holes 24*l* of the terminal 22, protrude to the negative side of the Z-axis from the face, which is located on the positive side of the Z-axis, of the cutout portion 23*f*. As shown in FIGS. 21 and 23, each boss 23*g* allows the terminal 22 to be fixed to the housing 23 as an end portion, which is located on the negative side of the Z-axis, of the boss 23*g* is squashed with heat in a state where the boss 23*g* is passed through the fourth penetrating hole 24*l* of the terminal 22 and the second plate portion 24*b* of the terminal 22 is substantially in surface contact with the face, which is located on the positive side of the Z-axis, of the cutout portion 23*f* of the housing 23. At this time, the face, which is located on the positive side of the Z-axis, of the cutout portion 23*f* functions as a determination plane for determining the height position of the terminal 22 in the housing 23 in the Z-axis direction.

Herein, as shown in FIGS. 28 to 30, the third sidewall portion 23*c* may have formed thereon a first reinforcement rib 23*h* such that the first reinforcement rib 23*h* protrudes to the positive side of the Y-axis from the third sidewall portion 23*c*. The first reinforcement rib 23*h* extends in the Z-axis direction, and is substantially rectangular in shape as seen in the X-axis direction. As shown in FIGS. 21 and 23, the first reinforcement rib 23*h* is disposed in the first slit portion 24*f* of the terminal 22.

In addition, as shown in FIGS. 28 to 30, the fourth sidewall portion 23*d* may have formed thereon a second reinforcement rib 23*i* such that the second reinforcement rib 23*i* protrudes to the negative side of the Y-axis from the fourth sidewall portion 23*d*. The second reinforcement rib 23*i* extends in the Z-axis direction, and is substantially rectangular in shape as seen in the X-axis direction. As shown in FIG. 21, the second reinforcement rib 23*i* is disposed in the second slit portion 24*g* of the terminal 22.

As described above, forming the first reinforcement rib 23*h* and the second reinforcement rib 23*i* in the housing 23 can improve the rigidity of the housing 23. Further, this can also avoid an increase in the size of the terminal block 21 because the first reinforcement rib 23*h* is disposed in the first slit portion 24*f* of the terminal 22 and the second reinforcement rib 23*i* is disposed in the second slit portion 24*g* of the terminal 22.

As shown in FIGS. 28 to 30, the fourth sidewall portion 23*d* has formed thereon a fixation portion 23*j* protruding to the positive side of the Y-axis from an end portion, which is located on the negative side of the X-axis, of the fourth sidewall portion 23*d*. The fixation portion 23*j* is in the shape of a plate that is substantially parallel with the XY plane, and is substantially rectangular in shape as seen in the Z-axis direction. At this time, an end portion, which is located on the positive side of the Y-axis, of the fixation portion 23*j* may have a chamfered portion 23*k* formed thereon.

In addition, as shown in FIGS. 28 and 29, the fixation portion 23*j* may be reinforced with a third reinforcement rib 23*l* from the opposite sides of the fixation portion 23*j* in the X-axis direction. The third reinforcement rib 23*l* has a substantially right triangular shape as seen in the X-axis direction, for example.

As shown in FIGS. 28 to 30, the fixation portion 23*j* has a first penetrating hole 23*m* formed therein. As shown in FIG. 23, a collar 30, which is adapted to pass a bolt 29 used for fixing the terminal block 21 to an electronic component, is disposed in the first penetrating hole 23*m*.

As shown in FIGS. 28 and 30, the ceiling portion 23*e* has a second penetrating hole 23*n* formed therein. As shown in FIGS. 19 to 21, the second penetrating hole 23*n* is adapted to pass the first conductive member 27.

Next, an assembly flow for the terminal block 21 of the present embodiment will be described. First, the distal end portion of the bent portion 24*j* of the terminal 22 is caused to protrude to the positive side of the Y-axis from the cutout portion 23*f* of the housing 23 while a portion of the terminal 22, which is located on the negative side of the Y-axis with respect to the bent portion 24*j*, is accommodated in the housing 23 from the negative side of the Z-axis.

At this time, the bosses 23*g* of the housing 23 are passed through the respective fourth penetrating holes 24*l* of the terminal 22, and also, the second plate portion 24*b* of the terminal 22 is caused to be substantially in surface contact with the face, which is located on the positive side of the Z-axis, of the cutout portion 23*f* of the housing 23. In addition, the first reinforcement rib 23*h* of the housing 23 is disposed in the first slit portion 24*f* of the terminal 22, and also, the second reinforcement rib 23*i* of the housing 23 is disposed in the second slit portion 24*g* of the terminal 22.

Next, the end portion, which is located on the negative side of the Z-axis, of each boss 23*g* of the housing 23 is squashed with heat so as to allow the bent portion 24*j* of the terminal 22 to be sandwiched between the end portion, which is located on the negative side of the Z-axis, of the boss 23*g* of the housing 23 and the face, which is located on the positive side of the Z-axis, of the cutout portion 23*f*, so that the terminal 22 is fixed to the housing 23. Accordingly, the assembly of the terminal block 21 is complete.

Next, a flow of fixing the terminal block 21 of the present embodiment to an electronic component, and electrically connecting the first conductive member 27 and the second conductive member 28 to the terminal block 21 will be described. First, the collar 30 is disposed in the first penetrating hole 23*m* of the housing 23. Then, the bolt 29 is passed through the collar 30 so as to be screwed into an internal thread portion of the electronic component, so that the terminal block 21 is fixed to the electronic component.

Next, for example, the shaft portion 25*a* of the first connection portion 25 of the terminal 22 is screwed into the internal thread portion 27*a* of the first conductive member 27 while the first conductive member 27 is passed through the second penetrating hole 23*n* of the housing 23 and through the first penetrating hole 24*h* of the terminal 22 from the positive side of the Z-axis, so that the first conductive member 27 is electrically connected to the terminal block 21.

Meanwhile, for example, the shaft portion 26*a* of the second connection portion 26 is passed through the penetrating hole 28*a* of the second conductive member 28 so that the second conductive member 28 is placed on the distal end portion of the bent portion 24*j* of the terminal 22, and a nut 31 is screwed around the shaft portion 26*a* of the second connection portion 26 from the positive side of the Z-axis. This allows the second conductive member 28 to be electrically connected to the terminal block 21. Accordingly, the terminal block 21 can be fixed to the electronic component, and also, the first conductive member 27 and the second conductive member 28 can be electrically connected to the terminal block 21.

Such a terminal block 21 is also configured such that, as with the terminal block 1 of Embodiment 1, the terminal body 24 is deformable in all directions including the X-axis direction, the Y-axis direction, and the Z-axis direction, and thus is able to absorb the positional displacement of the first conductive member 27 with respect to the terminal block 21. Therefore, the terminal block 21 of the present embodiment allows the first conductive member 27 to be favorably connected to the terminal block 21.

Furthermore, the terminal body 24 of the present embodiment is also shaped such that the first plate portion 24*a*, the second plate portion 24*b*, and the third plate portion 24*d* are disposed to overlap in the Z-axis direction such that they are substantially parallel with each other. Therefore, the deformations of the plate portions of the terminal body 24 can be cancelled out each other, and the third plate portion 24*d* can thus be maintained substantially parallel with the XY plane. Thus, the first conductive member 27 can be easily connected to the first connection portion 25 of the terminal 22. That is, the terminal block 21 of the present embodiment also has high connectivity to the first conductive member 27.

In addition, since the terminal body 24 of the present embodiment is also bent to have the third plate portion 24*d* located on the inner side thereof, it is possible to absorb the positional displacement of the first conductive member 27 with respect to the terminal block 21 while avoiding an increase in the size of the terminal body 24, and further, the terminal block 21. This contributes to reducing the size of the terminal block 21.

In particular, since the terminal body 24 of the present embodiment has the first slit portion 24*f* and the second slit portion 24*g* formed therein, the terminal body 24 is more easily deformable in comparison with the terminal body 6 of Embodiment 1. Therefore, the terminal block 21 of the present embodiment is able to more easily absorb the positional displacement of the first conductive member 27 with respect to the terminal block 21 in comparison with the terminal block 1 of Embodiment 1, and thus, the first conductive member 27 can be favorably connected to the terminal block 21.

In addition, when the housing 23 has the first reinforcement rib 23*h* and the second reinforcement rib 23*i* formed thereon, the rigidity of the housing 23 can be improved. Further, when the first reinforcement rib 23*h* is disposed in the first slit portion 24*f* of the terminal 22, and the second reinforcement rib 23*i* is disposed in the second slit portion 24*g* of the terminal 22, an increase in the size of the terminal block 21 can be avoided.

Although the terminal body 24 of the present embodiment has the first slit portion 24*f* and the second slit portion 24*g* formed therein, only one of them may be provided, or both of them may be omitted. In addition, although the first slit portion 24*f* is formed continuously in the first plate portion 24*a*, the first coupling portion 24*c*, and the second plate portion 24*b* of the terminal body 24, the first slit portion 24*f* need not be continuous, and may be formed in at least one of the first plate portion 24*a*, the first coupling portion 24*c*, or the second plate portion 24*b*.

Similarly, although the second slit portion 24*g* is formed continuously in the first plate portion 24*a*, the second coupling portion 24*e*, the third plate portion 24*d* of the terminal body 24, the second slit portion 24*g* need not be continuous, and may be formed in at least one of the first plate portion 24*a*, the second coupling portion 24*e*, or the third plate portion 24*d*.

Embodiment 3

Figure 31:
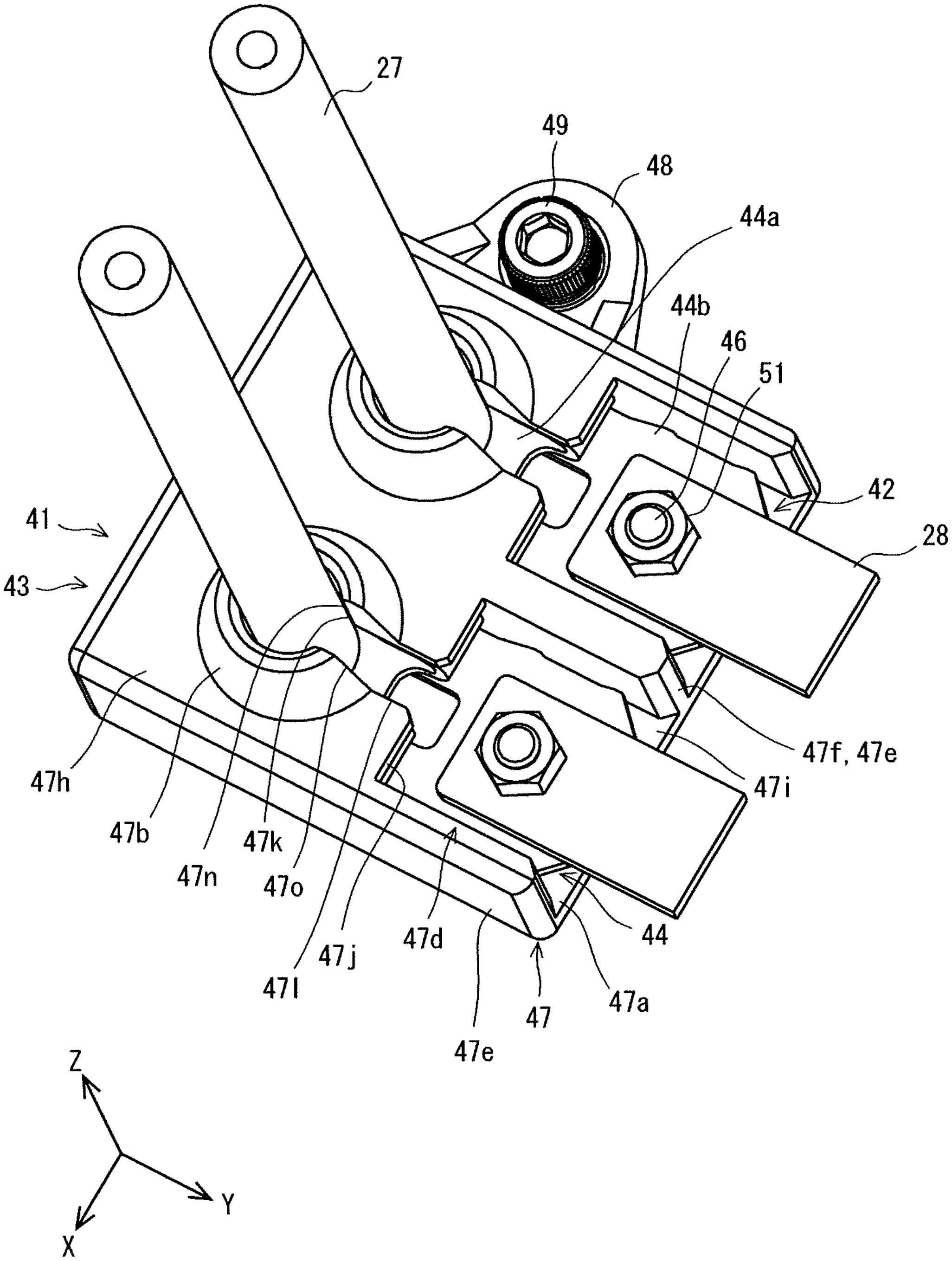
FIG. 31 is a perspective view of a terminal block of Embodiment 3 as seen from the positive side of the Z-axis.
Figure 32:
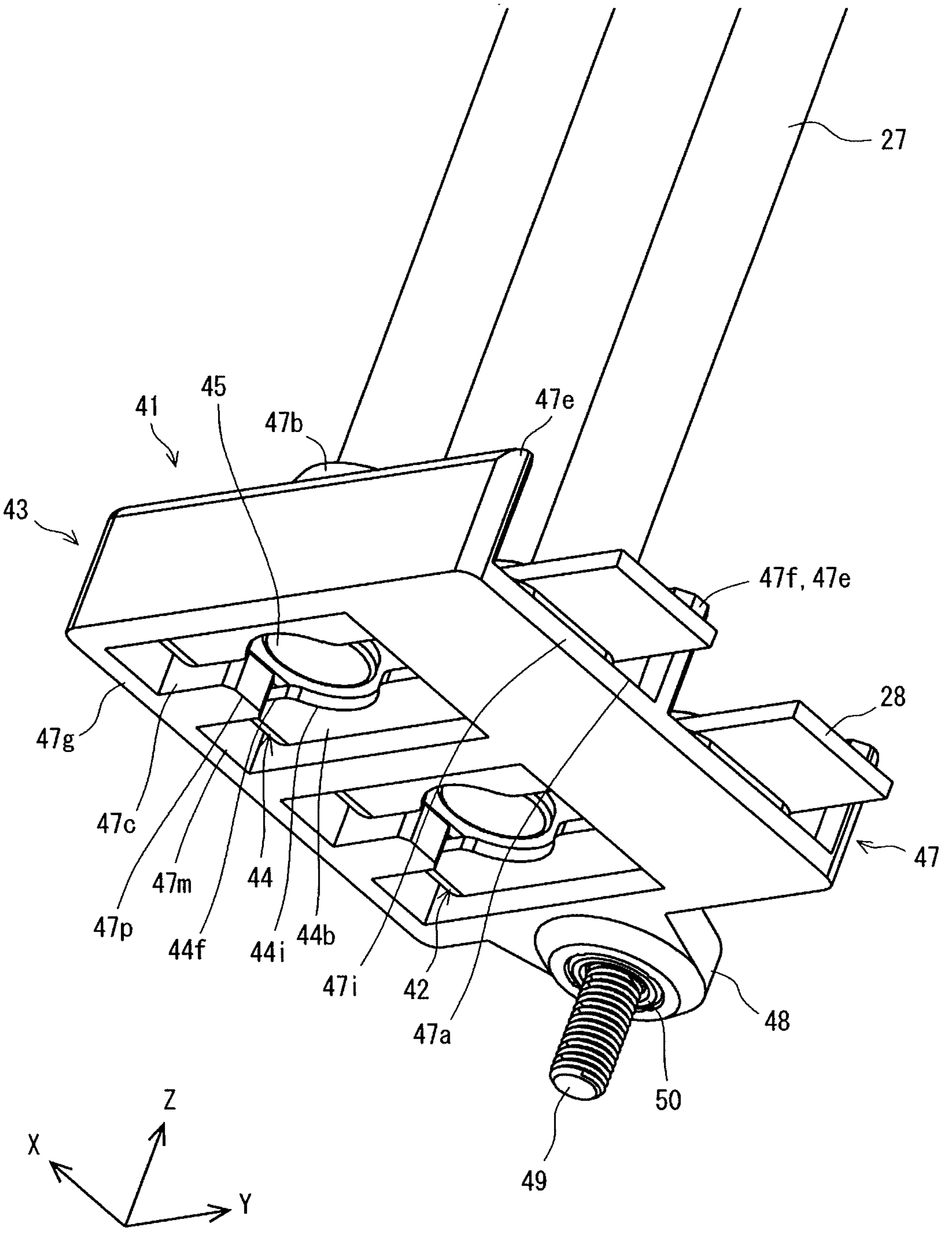
FIG. 32 is a perspective view of the terminal block of Embodiment 3 as seen from the negative side of the Z-axis.
Figure 33:
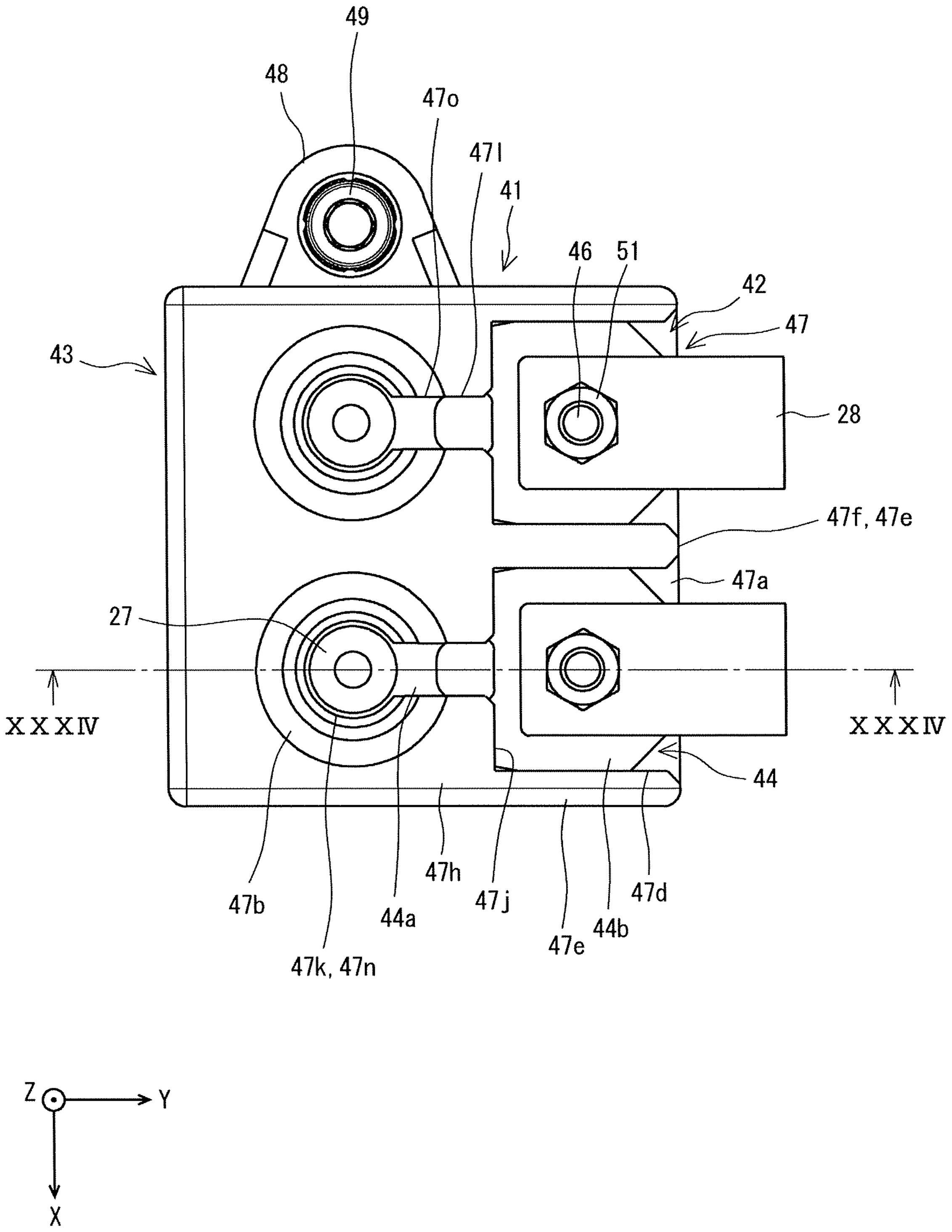
FIG. 33 is a view of the terminal block of Embodiment 3 as seen from the positive side of the Z-axis.
Figure 34:
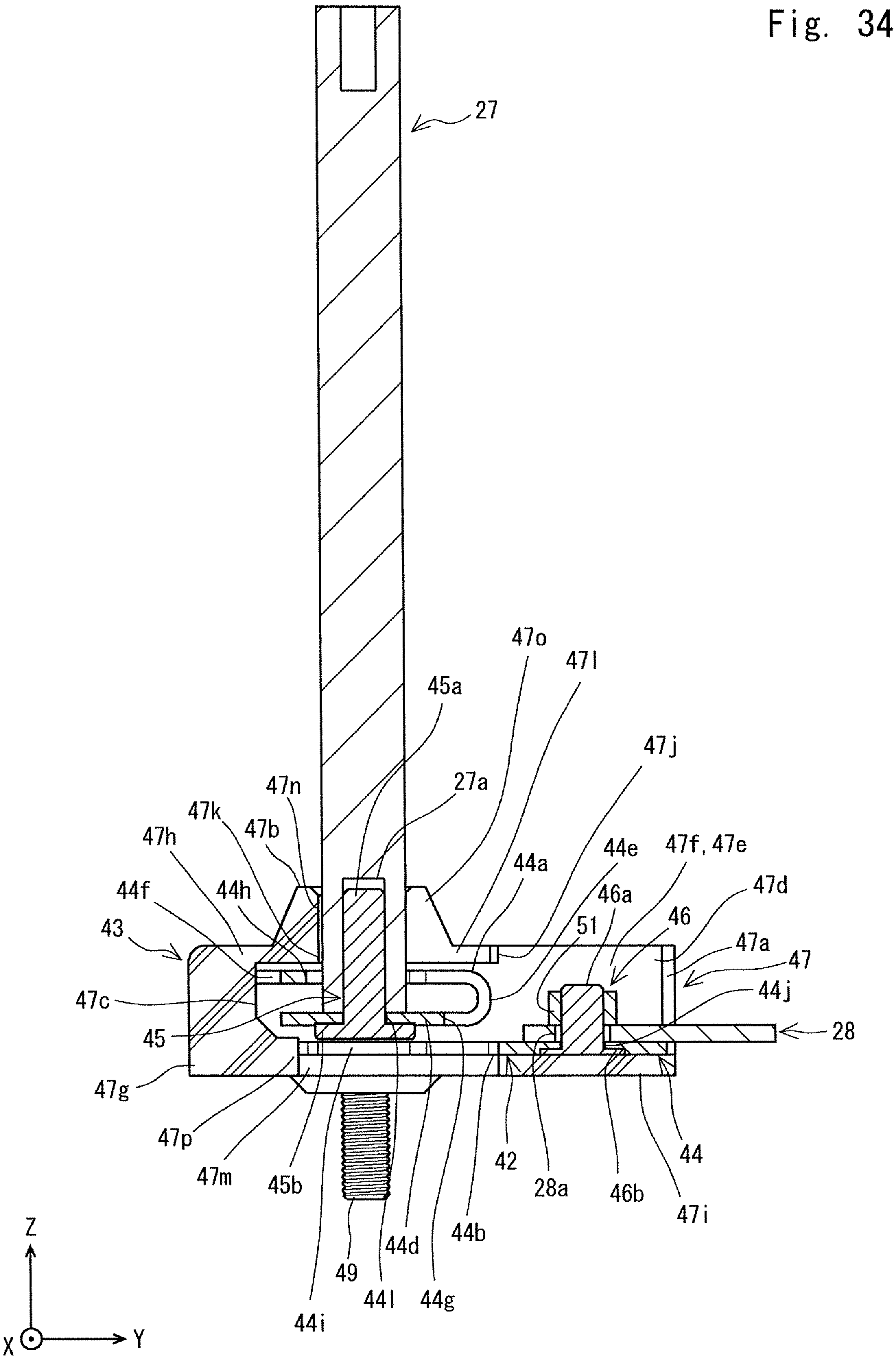
FIG. 34 is a cross-sectional view along line XXXIV-XXXIV in FIG. 33.

The configuration of a terminal block of the present embodiment will be described. FIG. 31 is a perspective view of the terminal block of the present embodiment as seen from the positive side of the Z-axis. FIG. 32 is a perspective view of the terminal block of the present embodiment as seen from the negative side of the Z-axis. FIG. 33 is a view of the terminal block of the present embodiment as seen from the positive side of the Z-axis. FIG. 34 is a cross-sectional view along line XXXIV-XXXIV in FIG. 33. Note that a terminal block 41 of the present embodiment has substantially the same configuration as the terminal block 1 of Embodiment 1 and the like. Thus, the overlapped description will be omitted.

As shown in FIGS. 31 to 34, the terminal block 41 includes terminals 42 on the positive side of the X-axis and on the negative side of the X-axis, and a housing 43. Herein, since the terminal 42 on the positive side of the X-axis and the terminal 42 on the negative side of the X-axis have the same configuration, the configuration of the terminal 42 on the positive side of the X-axis will be described as a representative example.

As shown in FIG. 34, the terminal 42 has substantially the same configuration as the terminal 22 of Embodiment 2, and specifically includes a terminal body 44, a first connection portion 45, and a second connection portion 46. The terminal body 44 is also a bent body obtained by bending a conductive material, such as a belt-like metallic plate, into a substantial spiral shape.

Figure 35:
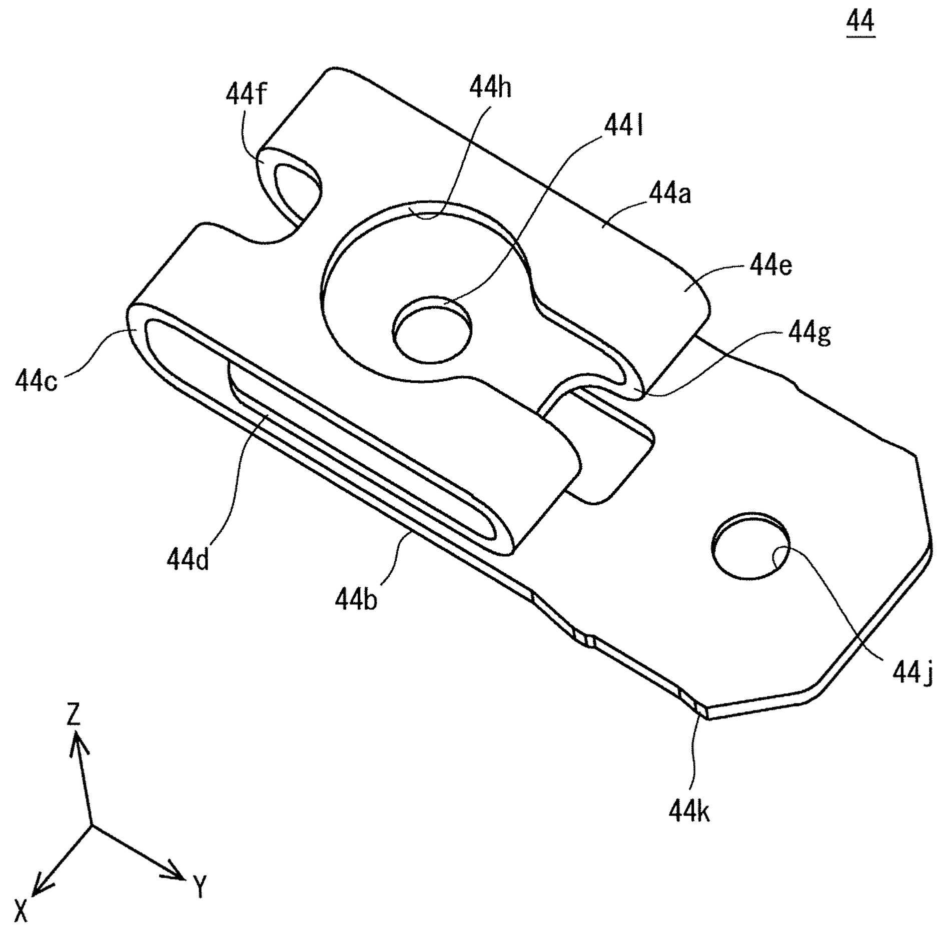
FIG. 35 is a perspective view of a terminal body in the terminal block of Embodiment 3 as seen from the positive side of the Z-axis.
Figure 36:
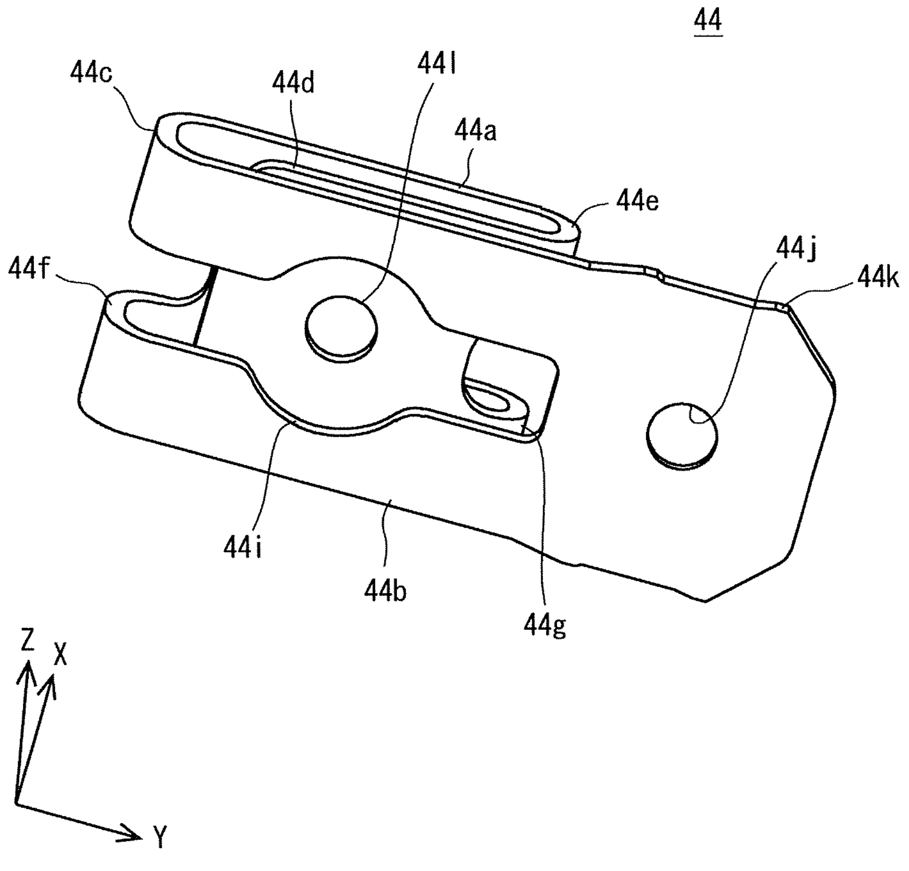
FIG. 36 is a perspective view of the terminal body in the terminal block of Embodiment 3 as seen from the negative side of the Z-axis.
Figure 37:
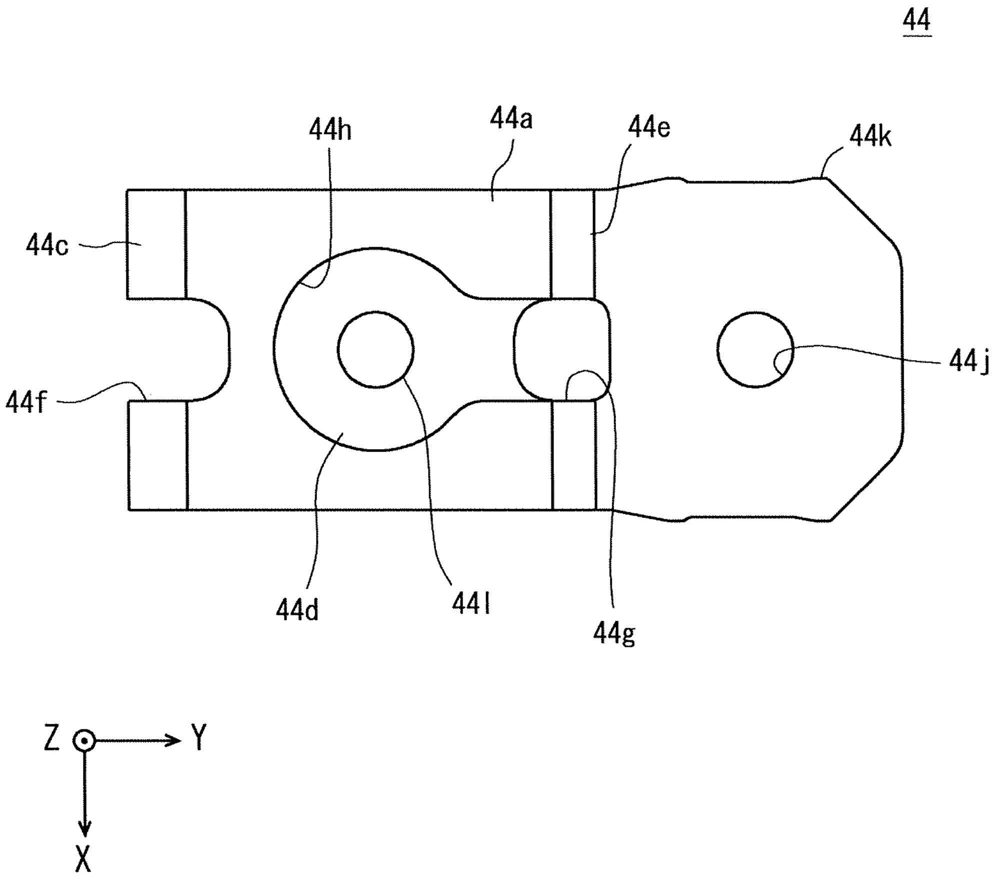
FIG. 37 is a view of the terminal body in the terminal block of Embodiment 3 as seen from the positive side of the Z-axis.
Figure 38:
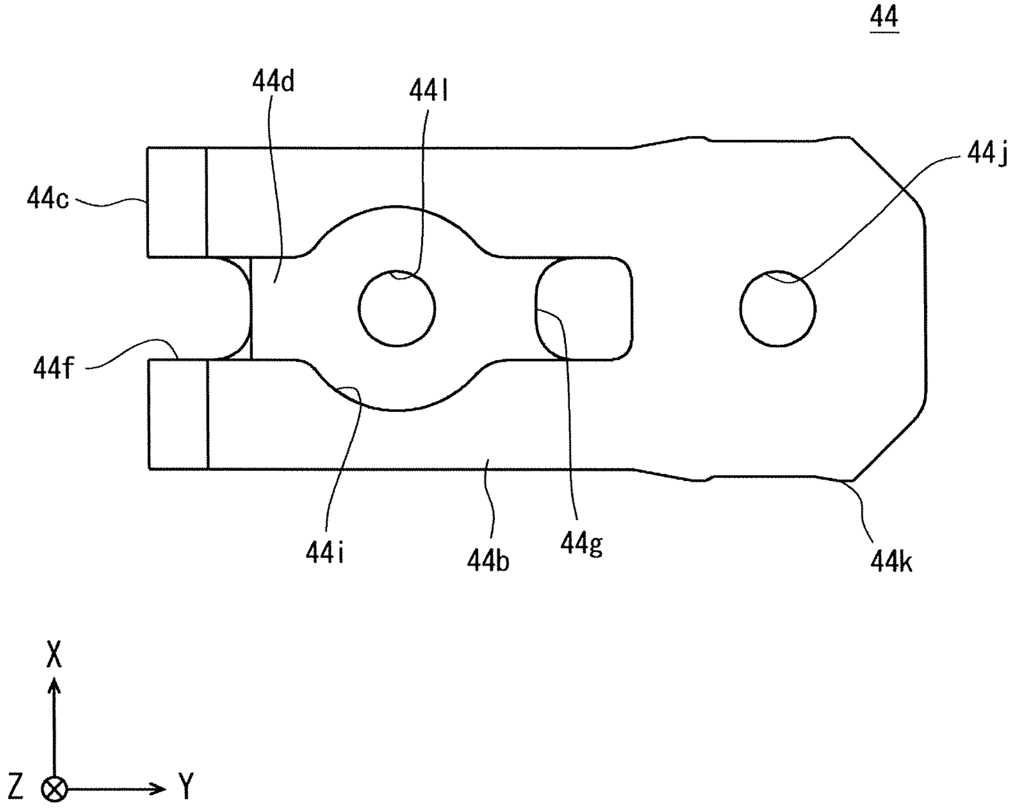
FIG. 38 is a view of the terminal body in the terminal block of Embodiment 3 as seen from the negative side of the Z-axis.

FIG. 35 is a perspective view of the terminal body in the terminal block of the present embodiment as seen from the positive side of the Z-axis. FIG. 36 is a perspective view of the terminal body in the terminal block of the present embodiment as seen from the negative side of the Z-axis. FIG. 37 is a view of the terminal body in the terminal block of the present embodiment as seen from the positive side of the Z-axis. FIG. 38 is a view of the terminal body in the terminal block of the present embodiment as seen from the negative side of the Z-axis.

As shown in FIGS. 34 to 38, the terminal body 44 includes a first plate portion 44*a*, a second plate portion 44*b*, a first coupling portion 44*c*, a third plate portion 44*d*, a second coupling portion 44*e*, a first slit portion 44*f*, and a second slit portion 44*g*.

As shown in FIGS. 34 to 38, the first plate portion 44*a* has formed therein a first penetrating hole 44*h* that is adapted to pass the first conductive member 27 and a crimp jig on the positive side of the Z-axis for fixing the first connection portion 45 to the third plate portion 44*d*. The second plate portion 44*b* has formed therein a second penetrating hole 44*i* that is adapted to pass a crimp jig on the negative side of the Z-axis for fixing the first connection portion 45 to the third plate portion 44*d*. Herein, the first connection portion 45 may include a bolt as with the first connection portion 25 of Embodiment 2, for example.

In addition, as shown in FIGS. 34 to 38, an end portion, which is located on the positive side of the Y-axis, of the second plate portion 44*b* has a third penetrating hole 44*j* formed therein, and the second connection portion 46 is fixed in a state where a shaft portion 46*a* of the second connection portion 46 is passed through the third penetrating hole 44*j*. Herein, the second connection portion 46 may include a bolt as with the second connection portion 26 of Embodiment 2, for example.

As shown in FIGS. 35 to 38, an end portion, which is located on the positive side of the Y-axis, of the second plate portion 44*b* does not include the bent portion 24*j* and the fourth penetrating holes 24*l* unlike the terminal body 24 of Embodiment 2. In addition, the end portion, which is located on the positive side of the Y-axis, of the second plate portion 44*b* has formed thereon wider portions 44*k* that are wider than the other portions in the X-axis direction.

As shown in FIGS. 37 and 38, each wider portion 44*k* is substantially triangular in shape as seen in the Z-axis direction, for example. At this time, each wider portion 44*k* may include an inclined portion such that its width dimension in the X-axis direction increases along the direction toward the positive side of the Y-axis as seen in the Z-axis direction.

As shown in FIGS. 37 and 38, the wider portions 44*k* on the positive side of the X-axis are disposed at a distance therebetween in the Y-axis direction, and the wider portions 44*k* on the negative side of the X-axis are disposed at a distance therebetween in the Y-axis direction. In addition, each wider portion 44*k* on the positive side of the X-axis and each wider portion 44*k* on the negative side of the X-axis are disposed facing each other in the X-axis direction.

As shown in FIGS. 34 to 38, the third plate portion 44*d* has a fourth penetrating hole 44*l* formed therein, and the first connection portion 45 is fixed in a state where a shaft portion 45*a* of the first connection portion 45 is passed through the fourth penetrating hole 44*l*.

The first slit portion 44*f* is formed continuously in the first plate portion 44*a*, the first coupling portion 44*c*, and the second plate portion 44*b*. At this time, as shown in FIGS. 36 and 38, the first slit portion 44*f* may be formed up to a position beyond the second penetrating hole 44*i* of the second plate portion 44*b* toward the positive side of the Y-axis, for example. The second slit portion 44*g* is formed continuously in the first plate portion 44*a*, the second coupling portion 44*e*, and the third plate portion 44*d*.

As shown in FIGS. 31 and 32, the housing 43 accommodates the terminals 42. The housing 43 includes a plurality of (for example, two) accommodation portions 47 arranged in the X-axis direction corresponding to the number of the terminals 42, and a fixation portion 48. Herein, the plurality of accommodation portions 47 have the same shape. Thus, the accommodation portion 47 on the positive side of the X-axis will be described as a representative example.

Figure 39:
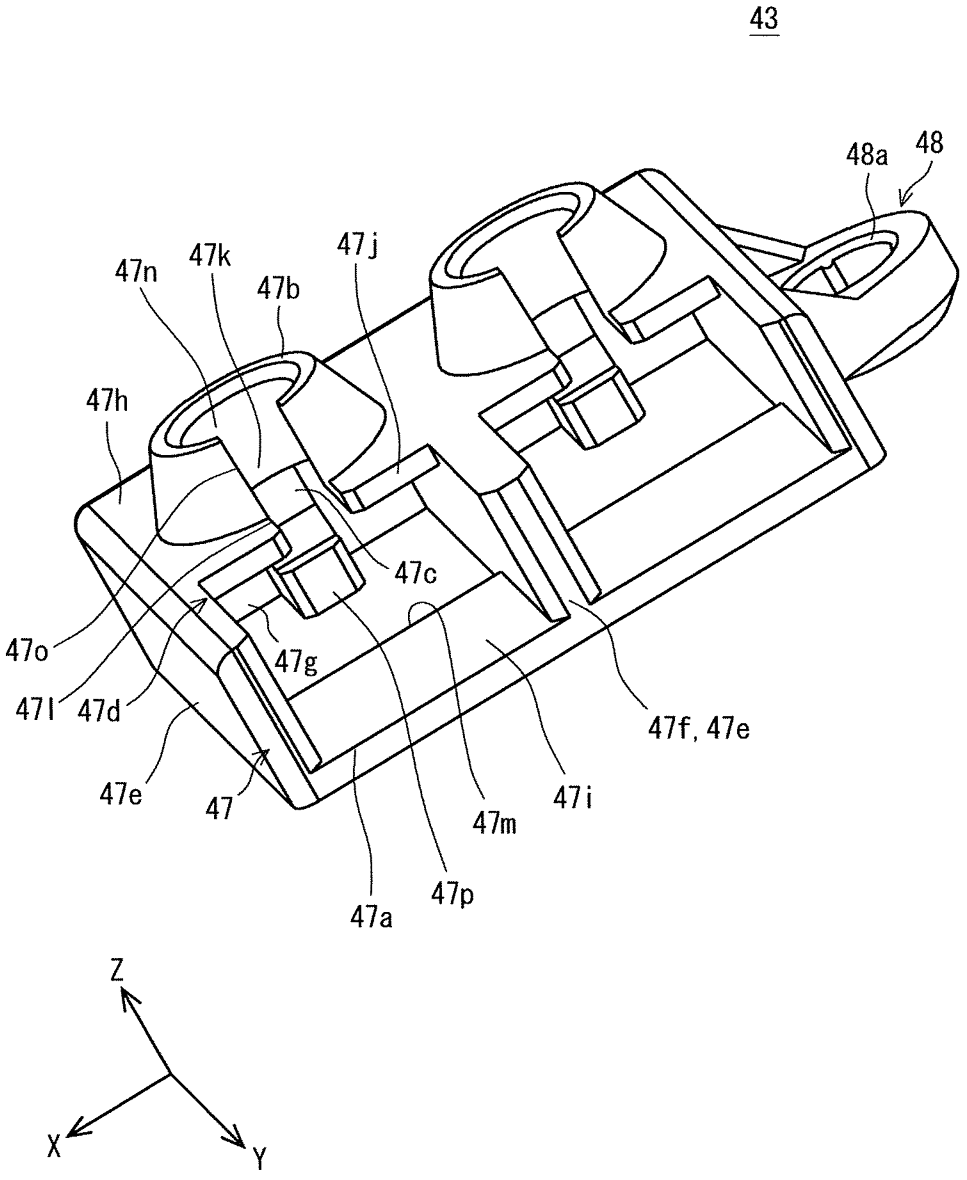
FIG. 39 is a perspective view of a housing of the terminal block of Embodiment 3 as seen from the positive side of the Z-axis.
Figure 40:
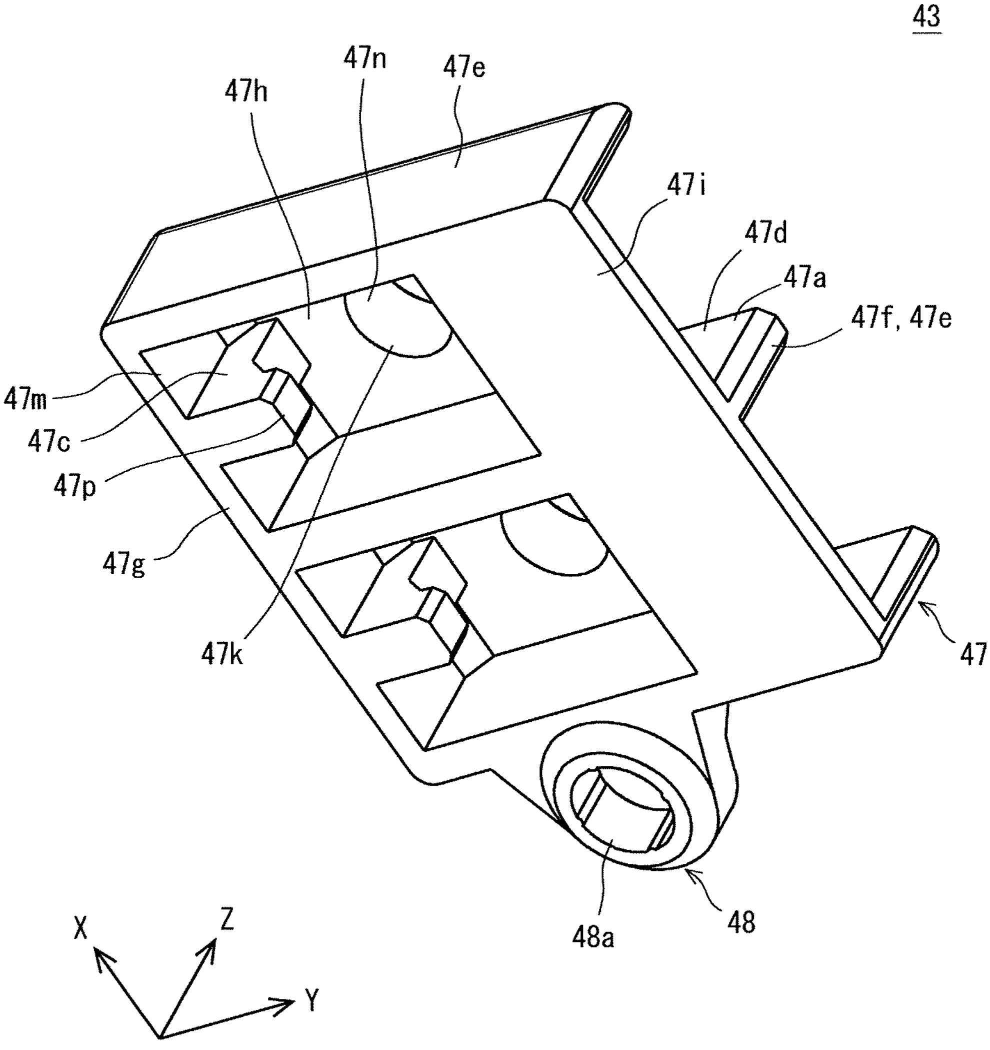
FIG. 40 is a perspective view of the housing of the terminal block of Embodiment 3 as seen from the negative side of the Z-axis.
Figure 41:
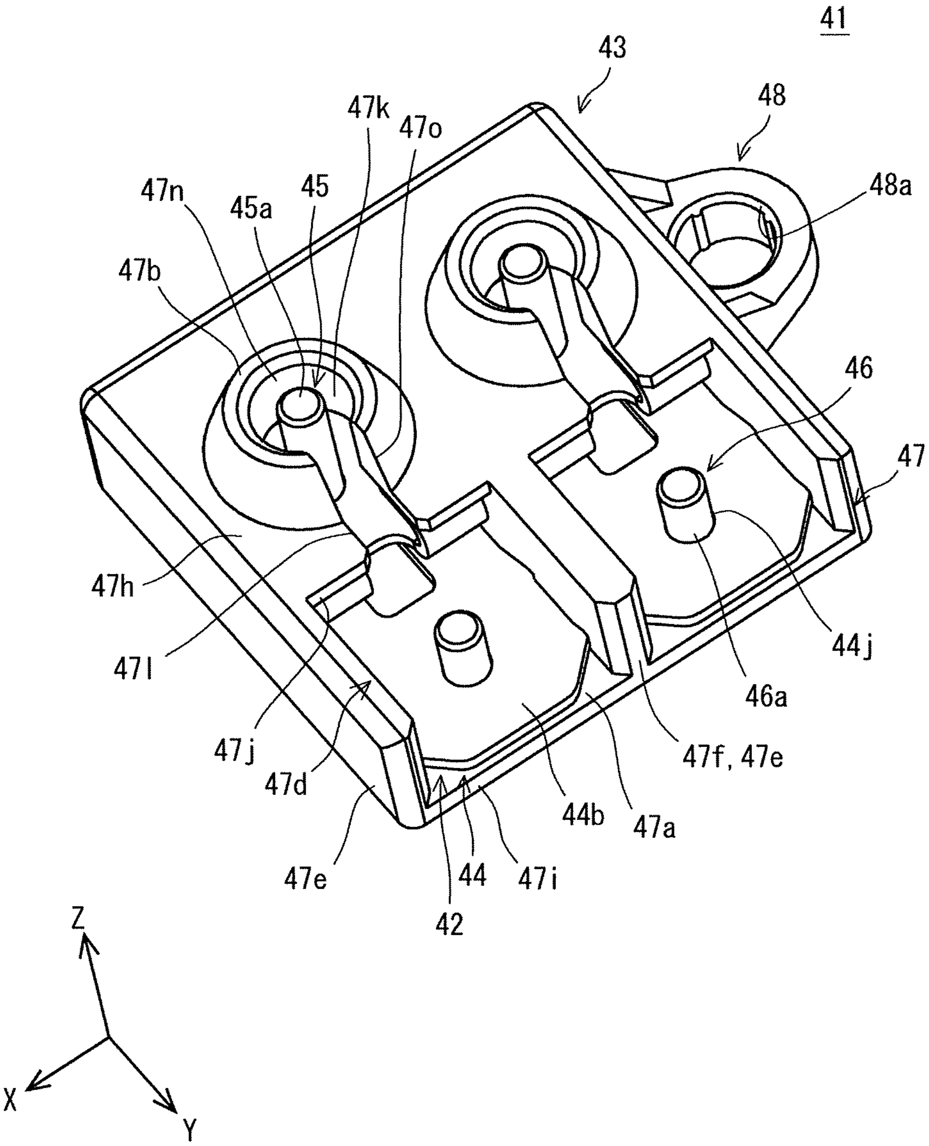
FIG. 41 is a perspective view showing the state of a terminal accommodated in the housing of the terminal block of Embodiment 3, as seen from the positive side of the Z-axis.
Figure 42:
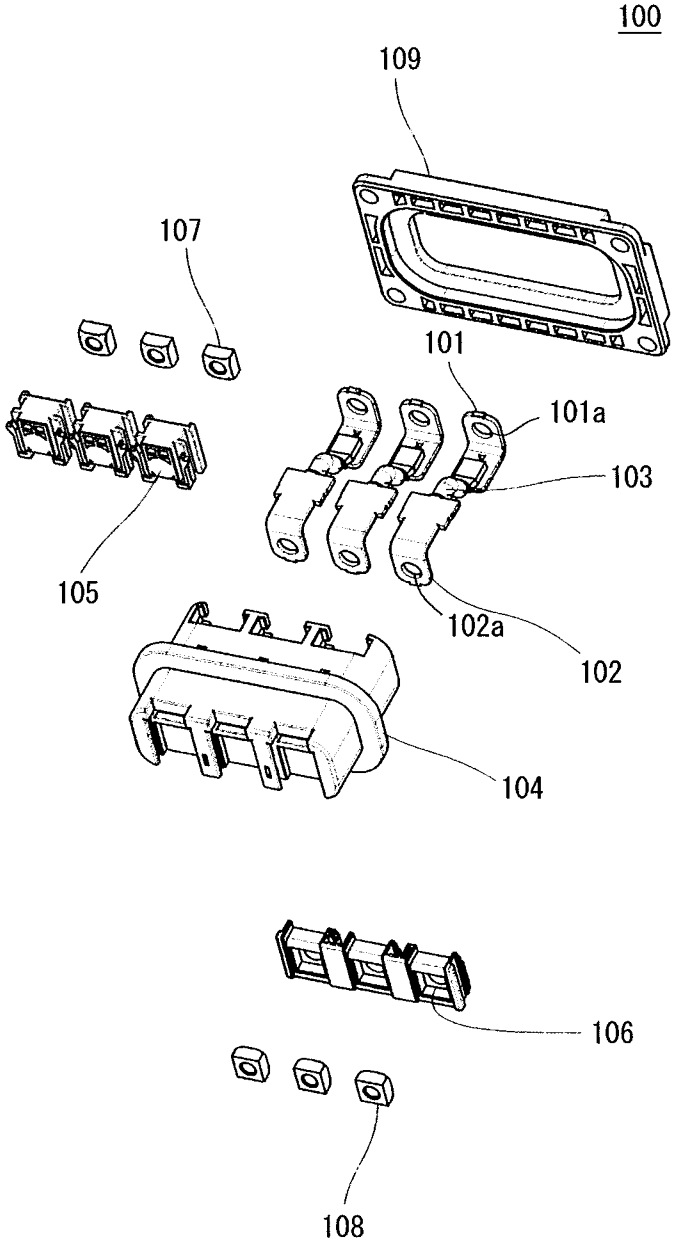
FIG. 42 is a view showing FIG. 5 of Japanese Unexamined Patent Application Publication No. 2022-61147.

FIG. 39 is a perspective view of the housing of the terminal block of the present embodiment as seen from the positive side of the Z-axis. FIG. 40 is a perspective view of the housing of the terminal block of the present embodiment as seen from the negative side of the Z-axis. FIG. 41 is a perspective view showing the state of terminals accommodated in the housing of the terminal block of the present embodiment, as seen from the positive side of the Z-axis.

As shown in FIGS. 39 and 40, the accommodation portion 47 includes a body 47*a*, a protruding portion 47*b*, a reinforcement rib 47*c*, and an insertion portion 47*d*. The body 47*a* has a roughly hollow, rectangular parallelepiped shape. The body 47*a* includes a first sidewall portion 47*e*, a second sidewall portion 47*f*, a third sidewall portion 47*g*, a ceiling portion 47*h*, and a bottom portion 47*i*.

As shown in FIGS. 39 to 41, the first sidewall portion 47*e* and the second sidewall portion 47*f* are disposed facing each other in the X-axis direction. The gap between the first sidewall portion 47*e* and the second sidewall portion 47*f* in the X-axis direction is substantially equal to the width dimension in the X-axis direction from an end portion, which is located on the positive side of the X-axis, of each wider portion 44*k* on the positive side of the X-axis of the terminal 42 to an end portion, which is located on the negative side of the X-axis, of each wider portion 44*k* on the negative side of the X-axis of the terminal 42. Herein, the second sidewall portion 47*f* also serves as the first sidewall portions 47*e* of the body 47*a* adjacent in the negative side of the X-axis.

As shown in FIGS. 39 and 40, the third sidewall portion 47*g* is continuous with an end portion, which is located on the negative side of the Y-axis, of the first sidewall portion 47*e* and with an end portion, which is located on the negative side of the Y-axis, of the second sidewall portion 47*f*. The ceiling portion 47*h* covers a portion, which is located on the negative side of the Y-axis, of a space surrounded by the first sidewall portion 47*e*, the second sidewall portion 47*f*, and the third sidewall portion 47*g* from the positive side of the Z-axis. Therefore, a first opening 47*j*, which is continuous, is formed on the positive side of the Y-axis of the body 47*a* and on the positive side of the Y-axis with respect to the ceiling portion 47*h*.

As shown in FIGS. 39 to 41, the ceiling portion 47*h* has a penetrating hole 47*k* and a cutout portion 47*l* formed therein. The penetrating hole 47*k* is adapted to pass the shaft portion 45*a* of the first connection portion 45. At this time, the penetrating hole 47*k*, the first penetrating hole 44*h* of the terminal 42, and the shaft portion 45*a* of the first connection portion 45 are disposed substantially concentrically as seen in the Z-axis direction. The penetrating hole 47*k* is substantially circular in shape as seen in the Z-axis direction, for example, and the diameter of the penetrating hole 47*k* is slightly larger than the diameter of the first conductive member 27.

As shown in FIGS. 39 to 41, the cutout portion 47*l* is formed in the ceiling portion 47*h*, and extends to the positive side of the Y-axis from the penetrating hole 47*k* so as to reach an end portion, which is located on the positive side of the Y-axis, of the ceiling portion 47*h*. The width dimension of the cutout portion 47*l* in the X-axis direction is slightly larger than the diameter of the shaft portion 45*a* of the first connection portion 45.

As shown in FIGS. 39 and 40, the bottom portion 47*i* connects a corner portion, which is located on the positive side of the Y-axis and on the negative side of the Z-axis, of the first sidewall portion 47*e* to a corner portion, which is located on the positive side of the Y-axis and on the negative side of the Z-axis, of the second sidewall portion 47*f*. Therefore, a second opening 47*m* is formed on the negative side of the Y-axis with respect to the bottom portion 47*i* of the body 47*a*.

As shown in FIG. 41, a face, which is located on the positive side of the Z-axis, of the bottom portion 47*i* has placed thereon an end portion, which is located on the positive side of the Y-axis, of the second plate portion 44*b* of the terminal 42. At this time, the face, which is located on the positive side of the Z-axis, of the bottom portion 47*i* functions as a determination plane for determining the height position of the terminal 42 in the body 47*a* in the Z-axis direction.

As shown in FIGS. 39 to 41, the protruding portion 47*b* protrudes to the positive side of the Z-axis from the ceiling portion 47*h* so as to surround the penetrating hole 47*k*. The protruding portion 47*b* is substantially annular in shape as seen in the Z-axis direction, for example, and may be substantially conical in shape such that the diameter of the outer peripheral side surface of the protruding portion 47*b* decreases along the direction toward the positive side of the Z-axis. The protruding portion 47*b* has a penetrating hole 47*n* and a cutout portion 47*o* formed therein.

As shown in FIGS. 39 to 41, the penetrating hole 47*n* is formed in the protruding portion 47*b*, and is continuous with the penetrating hole 47*k* of the body 47*a* in the Z-axis direction. The penetrating hole 47*n* is adapted to pass the shaft portion 45*a* of the first connection portion 45. The diameter of the penetrating hole 47*n* is substantially equal to the diameter of the penetrating hole 47*k* of the body 47*a*.

As shown in FIGS. 39 to 41, the cutout portion 47*o* is formed by partially cutting out the protruding portion 47*b* toward the positive side of the Y-axis. The cutout portion 47*o* is continuous with the cutout portion 47*l* of the body 47*a* in the Z-axis direction. The width dimension of the cutout portion 47*o* in the X-axis direction is substantially equal to the width dimension of the cutout portion 47*l* of the body 47*a* in the X-axis direction.

As shown in FIGS. 39 and 40, the reinforcement rib 47*c* protrudes to the positive side of the Y-axis from the third sidewall portion 47*g* of the body 47*a* as with the first reinforcement rib 23*h* of the housing 23 of Embodiment 2. As shown in FIGS. 32 and 34, the reinforcement rib 47*c* is disposed in the first slit portion 44*f* of the terminal 42.

At this time, as shown in FIGS. 39 and 40, the reinforcement rib 47*c* may have formed thereon a horizontal portion 47*p* protruding to the positive side of the Y-axis from an end portion, which is located on the negative side of the Z-axis, of the reinforcement rib 47*c*. As shown in FIGS. 32 and 34, the horizontal portion 47*p* is disposed on the negative side of the Z-axis with respect to an end portion, which is located on the negative side of the Y-axis, of the third plate portion 44*d* of the terminal 42.

The horizontal portion 47*p* is adapted to come into contact with the end portion, which is located on the negative side of the Y-axis, of the third plate portion 44*d* of the terminal 42 when the end portion, which is located on the negative side of the Y-axis, of the third plate portion 44*d* has been displaced to the negative side of the Z-axis by a predetermined displacement amount. This can restrict the displacement amount of the end portion, which is located on the negative side of the Y-axis, of the third plate portion 44*d*.

The insertion portion 47*d* is used to insert the terminal 22 into the body 47*a* as described above. As shown in FIGS. 39 to 41, the insertion portion 47*d* is formed of the first opening 47*j* of the body 47*a*, the cutout portion 47*l* of the body 47*a*, and the cutout portion 47*o* of the protruding portion 47*b*.

As shown in FIGS. 39 to 41, the fixation portion 48 has substantially the same shape as the fixation portion 23*j* of the housing 23 of Embodiment 2, and protrudes to the negative side of the X-axis from the accommodation portion 47 on the negative side of the X-axis, for example. The fixation portion 48 has a penetrating hole 48*a* formed therein. As shown in FIG. 32, a collar 50, which is adapted to pass a bolt 49 used to fix the terminal block 41 to an electronic component, is disposed in the penetrating hole 48*a*.

Next, an assembly flow for the terminal block 41 of the present embodiment will be described. First, the terminal 42 is inserted into the body 47*a* from the first opening 47*j* of the body 47*a* at the insertion portion 47*d* of the housing 43 toward the negative side of the Y-axis.

Then, the shaft portion 45*a* of the first connection portion 45 of the terminal 42 is passed through the cutout portion 47*l* of the body 47*a* and through the cutout portion 47*o* of the protruding portion 47*b* at the insertion portion 47*d* of the housing 43. Further, the shaft portion 45*a* of the first connection portion 45 of the terminal 42 is passed through the penetrating hole 47*k* of the body 47*a* and through the penetrating hole 47*n* of the protruding portion 47*b*.

At this time, the shaft portion 45*a* of the first connection portion 45 of the terminal 42, the first penetrating hole 44*h* of the terminal 42, the penetrating hole 47*k* of the body 47*a*, and the penetrating hole 47*n* of the protruding portion 47*b* are disposed substantially concentrically as seen in the Z-axis direction.

Along with this, the end portion, which is located on the positive side of the Y-axis, of the second plate portion 44*b* of the terminal 42 is placed on the face, which is located on the positive side of the Z-axis, of the bottom portion 47*i* of the body 47*a*. At this time, the gap between the first sidewall portion 47*e* and the second sidewall portion 47*f* of the body 47*a* of the housing 43 in the X-axis direction is substantially equal to the width dimension in the X-axis direction from the end portion, which is located on the positive side of the X-axis, of each wider portion 44*k* on the positive side of the X-axis of the terminal 42 to the end portion, which is located on the negative side of the X-axis, of each wider portion 44*k* on the negative side of the X-axis of the terminal 42.

Therefore, the end portion, which is located on the positive side of the Y-axis, of the second plate portion 44*b* of the terminal 42 is held by being sandwiched between the first sidewall portion 47*e* and the second sidewall portion 47*f* of the body 47*a* of the housing 43. This allows the terminal 42 to be restrained in the housing 43. Accordingly, the assembly of the terminal block 41 is complete.

Next, a flow of fixing the terminal block 41 of the present embodiment to an electronic component, and electrically connecting the first conductive member 27 and the second conductive member 28 to the terminal block 41 will be described. First, the collar 50 is disposed in the penetrating hole 48*a* of the fixation portion 48 of the housing 43. Then, the bolt 49 is passed through the collar 50 so as to be screwed into an internal thread portion of the electronic component, so that the terminal block 41 is fixed to the electronic component.

Next, for example, the shaft portion 45*a* of the first connection portion 45 of the terminal 42 is screwed into the internal thread portion 27*a* of the first conductive member 27 while the first conductive member 27 is passed through the penetrating hole 47*k* of the body 47*a* and the penetrating hole 47*n* of the protruding portion 47*b* in the housing 43 and through the first penetrating hole 44*h* of the terminal 42 from the positive side of the Z-axis, so that the first conductive member 27 is electrically connected to the terminal block 41.

At this time, the first conductive member 27 is surrounded by the protruding portion 47*b* of the accommodation portion 47, and comes into contact with the protruding portion 47*b* when the first conductive member 27 swings. This can restrict the swing of the first conductive member 27.

Meanwhile, for example, the shaft portion 46*a* of the second connection portion 46 is passed through the penetrating hole 28*a* of the second conductive member 28 via the first opening 47*j* of the body 47*a* at the insertion portion 47*d* of the housing 43, so that the second conductive member 28 is placed on the end portion, which is located on the positive side of the Y-axis, of the second plate portion 44*b* of the terminal 42 from the positive side of the Z-axis.

Then, a nut 51 is screwed around the shaft portion 46*a* of the second connection portion 46 to electrically connect the second conductive member 28 to the terminal block 41. Accordingly, the terminal block 41 can be fixed to the electronic component, and also, the first conductive member 27 and the second conductive member 28 can be electrically connected to the terminal block 41.

Such a terminal block 41 is also configured such that, as with the terminal block 1 of Embodiment 1, the terminal body 44 is deformable in all directions including the X-axis direction, the Y-axis direction, and the Z-axis direction, and thus is able to absorb the positional displacement of the first conductive member 27 with respect to the terminal block 41. Therefore, the terminal block 41 of the present embodiment allows the first conductive member 27 to be favorably connected to the terminal block 41.

Furthermore, the terminal body 44 of the present embodiment is also shaped such that the first plate portion 44*a*, the second plate portion 44*b*, and the third plate portion 44*d* are disposed to overlap in the Z-axis direction such that they are substantially parallel with each other. Therefore, the deformations of the plate portions of the terminal body 44 can be cancelled out each other, and the third plate portion 44*d* can thus be maintained substantially parallel with the XY plane. Thus, the first conductive member 27 can be easily connected to the first connection portion 45 of the terminal 42. That is, the terminal block 41 of the present embodiment also has high connectivity to the first conductive member 27.

In addition, since the terminal body 44 of the present embodiment is also bent to have the third plate portion 44*d* located on the inner side thereof, it is possible to absorb the positional displacement of the first conductive member 27 with respect to the terminal block 41 while avoiding an increase in the size of the terminal body 44, and further, the terminal block 41. This contributes to reducing the size of the terminal block 41.

In particular, since the housing 43 of the terminal block 41 of the present embodiment has the protruding portion 47*b* formed thereon, it is possible to, when the first conductive member 27 swings, allow the first conductive member 27 to come into contact with the protruding portion 47*b*, and thus restrict the swing of the first conductive member 27. Further, since the reinforcement rib 47*c* of the housing 43 of the terminal block 41 has the horizontal portion 47*p* formed thereon, it is possible to, when the end portion, which is located on the negative side of the Y-axis, of the third plate portion 44*d* of the terminal 42 has been displaced to the negative side of the Z-axis by a predetermined displacement amount, allow the horizontal portion 47*p* to come into contact with the end portion, which is located on the negative side of the Y-axis, of the third plate portion 44*d*, and thus restrict the displacement amount of the end portion, which is located on the negative side of the Y-axis, of the third plate portion 44*d*.

In addition, since the housing 43 of the terminal block 41 of the present embodiment has the insertion portion 47*d* formed therein, it is possible to allow the terminal 42 to be easily inserted into the accommodation portion 47 of the housing 43 toward the negative side of the Y-axis. This allows for easy assembly of the terminal block 41.

The present disclosure is not limited to the foregoing embodiments, and can be changed as appropriate within the gist of the present disclosure.

The number of each of the terminals 4, 22, and 42 in the terminal blocks 1, 21, and 41 of the foregoing embodiments is only exemplary, and thus can be changed as appropriate. In such a case, the shape of the housing can be changed as appropriate so that the terminals 4, 22, or 42 can be accommodated therein according to the number of the terminals 4, 22, or 42.

The terminal block 1, 21, or 41 of each of the foregoing embodiments is fixed to an electronic component, but the type of a fixation component to which such a terminal block is fixed is not limited to a particular one. Further, the number, arrangement, shape and the like of the fixation portion(s) of the housing are not limited to particular ones as long as the terminal block can be fixed to the fixation component. Further, a means for fixing the terminal block to the fixation component is not limited to a particular one, either.

The first conductive member 2 or 27 and the second conductive member 3 or 28 that are electrically connected to the terminal block 1, 21, or 41 of each of the foregoing embodiments are only exemplary. Thus, it is acceptable as long as such conductive members are shaped such that they can be electrically connected to the terminal 4, 22, or 42. In addition, a means for electrically connecting the first conductive member and the second conductive member to the terminal is not limited to a particular one, either.

The shape of the terminal body 6, 24, or 44 of the terminal block 1, 21, or 41 and the shape of the housing 5, 23, or 43 of each of the foregoing embodiments is only exemplary. In sum, it is acceptable as long as a terminal is provided that is bent into a flat spiral shape so as to allow the third plate portion, the second coupling portion, the first plate portion, the first coupling portion, and the second plate portion to be continuous, and that allows a first conductive member to be electrically connected to the third plate portion via a penetrating hole formed in the first plate portion.

The first to third embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A terminal block comprising:
a terminal; and
a housing adapted to accommodate the terminal, wherein the terminal includes
a terminal body that is a bent body of a conductive material,
a first connection portion disposed on one end portion of the terminal body, the first connection portion being adapted to electrically connect to a first conductive member, and
a second connection portion disposed on another end portion of the terminal body, the second connection portion being adapted to electrically connect to a second conductive member,
the terminal body includes
a first plate portion parallel with a plane perpendicular to a first axis,
a second plate portion parallel with the plane perpendicular to the first axis, the second plate portion being disposed to overlap the first plate portion in a direction along the first axis,
a first coupling portion connecting one end portion of the first plate portion in a direction along a second axis perpendicular to the first axis to one end portion of the second plate portion in the direction along the second axis,
a third plate portion disposed between the first plate portion and the second plate portion, the third plate portion being parallel with the plane perpendicular to the first axis,
a second coupling portion connecting another end portion of the first plate portion in the direction along the second axis to one end portion of the third plate portion in the direction along the second axis, and
a penetrating hole formed in the first plate portion, and
the first connection portion is disposed on the third plate portion, and the first conductive member is electrically connected to the third plate portion via the penetrating hole.

2. The terminal block according to claim 1, wherein the terminal body includes a slit portion formed in one or more of the third plate portion, the second coupling portion, the first plate portion, the first coupling portion, and the second plate portion.

3. The terminal block according to claim 2, wherein the terminal body includes a slit portion formed continuously in two or more of the third plate portion, the second coupling portion, the first plate portion, the first coupling portion, and the second plate portion.

4. The terminal block according to claim 1, wherein the terminal body includes a penetrating hole formed in the second plate portion.

5. The terminal block according to claim 1, wherein the first plate portion is formed such that a width dimension of the first plate portion in a direction along a third axis perpendicular to the first axis and the second axis decreases along a direction toward the other end portion of the first plate portion along the second axis.

6. The terminal block according to claim 1, wherein
a connection member electrically connecting to the first conductive member is fixed as the first connection portion on the third plate portion, and
the connection member protrudes from the penetrating hole in the first plate portion to a side opposite to the third plate portion.

7. The terminal block according to claim 6, wherein
the housing includes
a body adapted to accommodate the terminal, the body including a penetrating hole adapted to pass the first conductive member, and
a protruding portion protruding from the body in the direction along the first axis so as to restrict swing of the first conductive member in a state where the first conductive member is passed through the penetrating hole in the body.

8. The terminal block according to claim 7, wherein the housing includes an insertion portion formed in the body, the insertion portion being adapted to be used for inserting the terminal into the body while passing the connection member through the penetrating hole in the body and through an inside of the protruding portion in the direction along the second axis.

9. The terminal block according to claim 1, wherein
the housing includes a reinforcement rib, the reinforcement rib being adapted to be passed through a slit portion formed continuously in the first plate portion, the first coupling portion, and the second plate portion of the terminal body,
the reinforcement rib includes a horizontal portion, the horizontal portion being adapted to be disposed on the other end portion of the third plate portion in the direction along the second axis on a side of the second plate portion, and
the other end portion of the third plate portion in the direction along the second axis comes into contact with the horizontal portion when displaced to the side of the second plate portion by a displacement amount set in advance.

10. A method for producing the terminal body used for the terminal block according to claim 1, comprising:
bending a belt-like material made of a conductive material that is long in one axis direction into a flat spiral shape so as to form the third plate portion, the second coupling portion, the first plate portion, the first coupling portion, and the second plate portion of the terminal body.

* * * * *